(12) United States Patent
Yajima et al.

(10) Patent No.: US 10,848,504 B2
(45) Date of Patent: *Nov. 24, 2020

(54) DEVICE AND METHOD FOR DETECTING ATTACK IN NETWORK

(71) Applicant: FUJITSU LIMITED, Kawasaki (JP)

(72) Inventors: Jun Yajima, Kawasaki (JP); Takayuki Hasebe, Kawasaki (JP); Yasuhiko Abe, Niiza (JP)

(73) Assignee: FUJITSU LIMITED, Kawasaki (JP)

(*) Notice: Subject to any disclaimer, the term of this patent is extended or adjusted under 35 U.S.C. 154(b) by 172 days.

This patent is subject to a terminal disclaimer.

(21) Appl. No.: 16/001,754

(22) Filed: Jun. 6, 2018

(65) Prior Publication Data

US 2019/0007427 A1   Jan. 3, 2019

(30) Foreign Application Priority Data

Jun. 29, 2017  (JP) ................... 2017-127819

(51) Int. Cl.
*H04L 29/06* (2006.01)

(52) U.S. Cl.
CPC ........ *H04L 63/1416* (2013.01); *H04L 63/108* (2013.01); *H04L 63/1425* (2013.01); *H04L 2463/121* (2013.01)

(58) Field of Classification Search
CPC .......... H04L 63/1416; H04L 63/1425; H04L 2463/121; H04L 63/108; H04L 47/10;

(Continued)

(56) References Cited

U.S. PATENT DOCUMENTS

2008/0291915 A1* 11/2008 Foschiano ............. H04L 43/026
370/392
2009/0044276 A1* 2/2009 Abdel-Aziz ........ H04L 63/1425
726/24

(Continued)

FOREIGN PATENT DOCUMENTS

JP   2012-109666   6/2012
JP   2014-146868   8/2014

(Continued)

OTHER PUBLICATIONS

U.S. Notice of Allowance dated Aug. 19, 2020 for copending U.S. Appl. No. 16/249,973, 21 pages. Please note that some references cited herewith, were previously cited in an IDS filed on Jun. 6, 2018 and by the Examiner on Mar. 12, 2020.*.

(Continued)

*Primary Examiner* — Darren B Schwartz
*Assistant Examiner* — Ka Shan Choy
(74) *Attorney, Agent, or Firm* — Fujitsu Patent Center

(57) ABSTRACT

An attack detection device includes: a receiver configured to receive messages that are periodically transmitted from a communication device in a network; and a processor. The processor predicts a number of messages to be received by the receiver in a specified monitor range based on a transmission cycle of the messages so as to generate a predicted value. The processor counts a number of messages received by the receiver in the specified monitor range so as to generate a count value. The processor detects an attack in the network according to a result of a comparison between the predicted value and the count value.

9 Claims, 18 Drawing Sheets

(58) Field of Classification Search
CPC . H04L 63/1408; H04L 63/20; H04L 63/1458; H04L 63/14; H04L 63/145; H04L 63/1441; H04L 63/0254; H04L 63/0263; H04L 63/02

See application file for complete search history.

(56) References Cited

U.S. PATENT DOCUMENTS

| | | |
|---|---|---|
| 2012/0124221 A1 | 5/2012 | Kondo et al. |
| 2014/0328352 A1 | 11/2014 | Mabuchi et al. |
| 2015/0358351 A1 | 12/2015 | Otsuka et al. |
| 2016/0205194 A1 | 7/2016 | Kishikawa et al. |
| 2017/0163680 A1 | 6/2017 | Chen et al. |
| 2017/0315523 A1 | 11/2017 | Cross et al. |
| 2017/0359372 A1* | 12/2017 | Ronen ................. H04L 63/1458 |

FOREIGN PATENT DOCUMENTS

| | | |
|---|---|---|
| WO | 2013-094072 | 6/2013 |
| WO | 2015-170451 | 11/2015 |

OTHER PUBLICATIONS

Notice of Allowance dated Sep. 21, 2020 for copending U.S. Appl. No. 16/249,973, 6 pages.

* cited by examiner

| SOF | ARBITRATION | CTRL | | | DATA | CRC | | ACK | | EOF |
|---|---|---|---|---|---|---|---|---|---|---|
| | ID | RTR | IDE | RES | DLC | | CRC SEQ | CRC DEL | ACK SLOT | ACK DEL | |
| 1 | 11 | 1 | 1 | 1 | 4 | 0–64 | 15 | 1 | 1 | 1 | 7 |

~F1

| SOF | ARBITRATION | | | | CTRL | | | | DATA | CRC | | ACK | | EOF |
|---|---|---|---|---|---|---|---|---|---|---|---|---|---|---|
| | ID BASE | SRR | IDE | ID EXT | RTR | r1 | RES | DLC | | CRC SEQ | CRC DEL | ACK SLOT | ACK DEL | |
| 1 | 11 | 1 | 1 | 18 | 1 | 1 | 1 | 4 | 0–64 | 15 | 1 | 1 | 1 | 7 |

~F2

F I G. 2

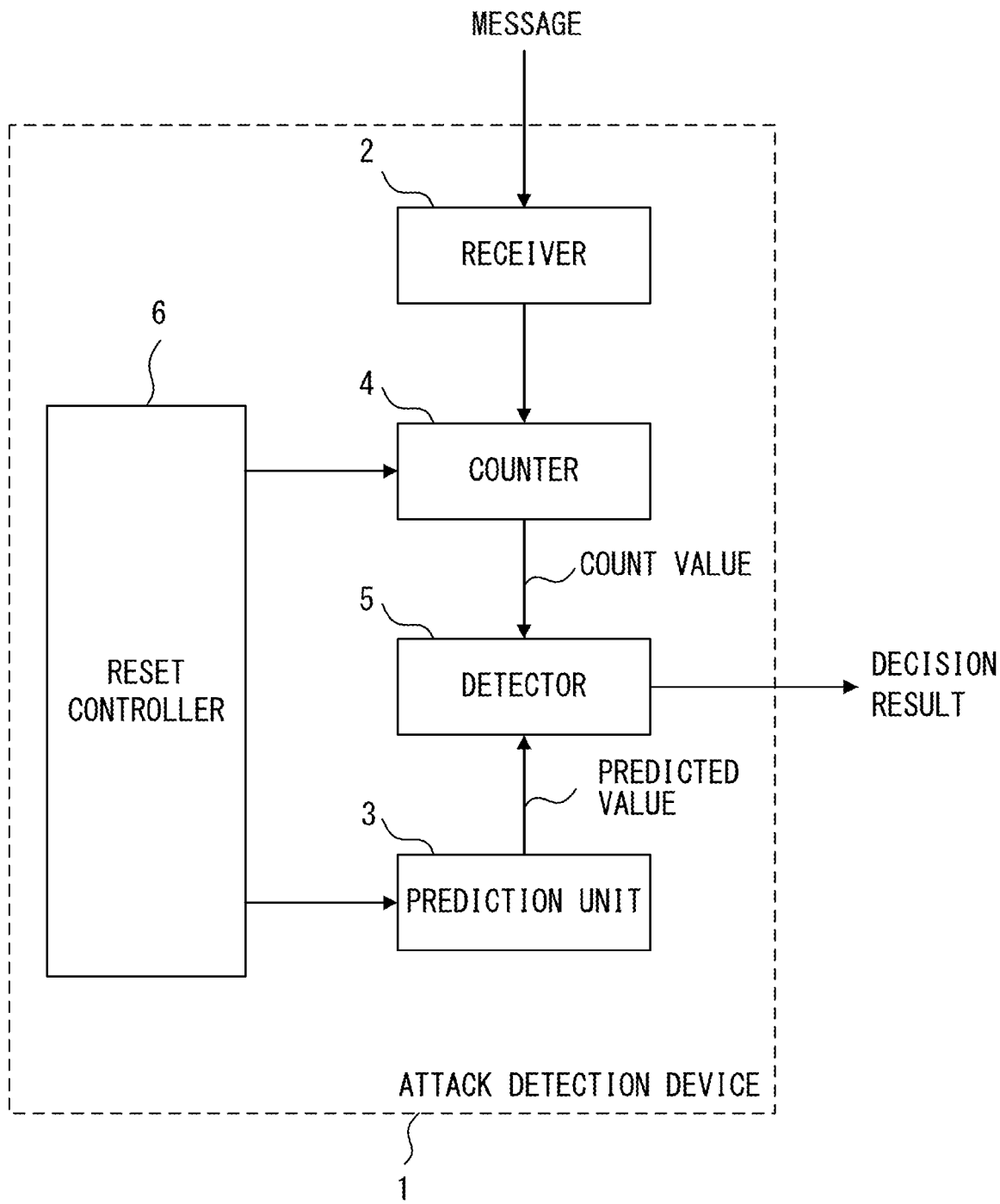
F I G. 4

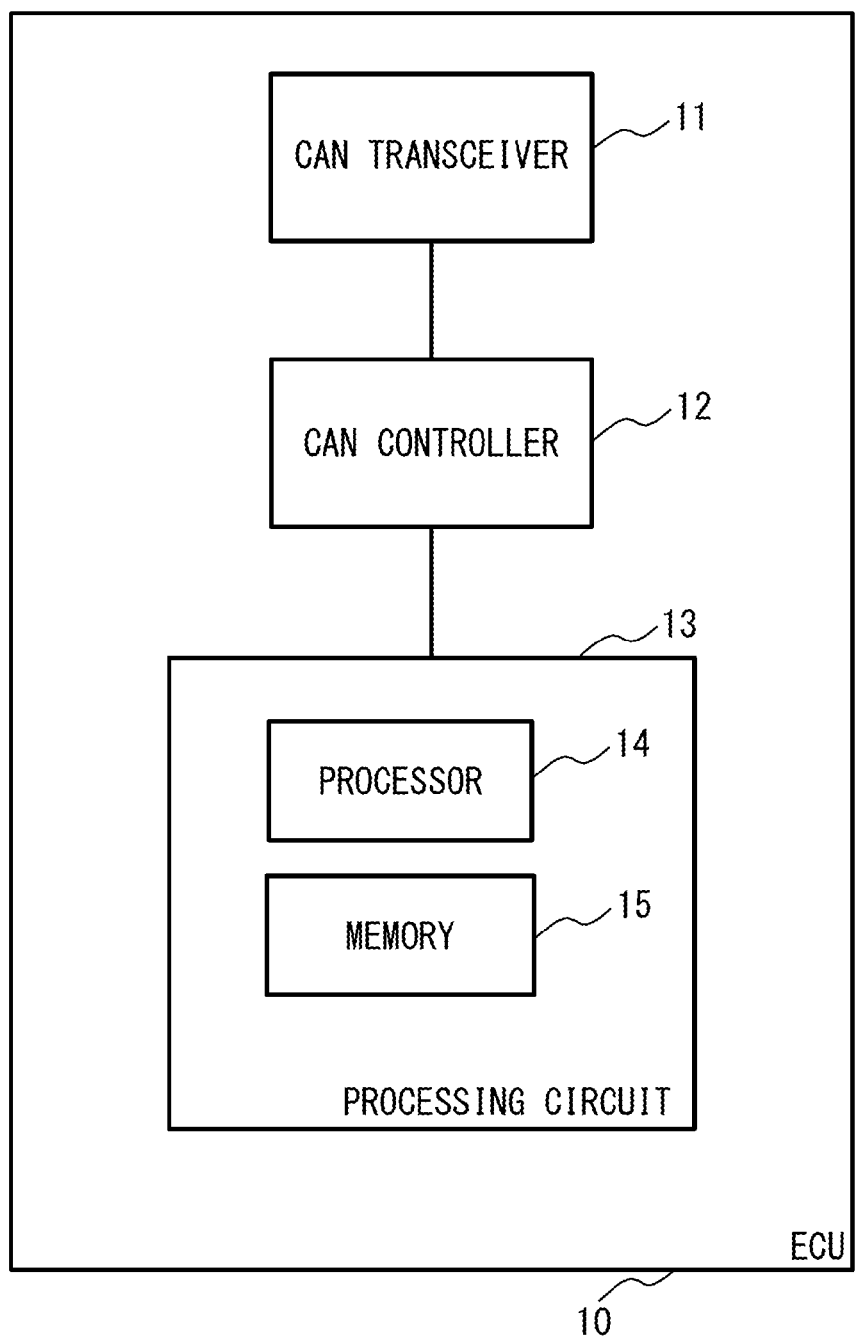
F I G. 5

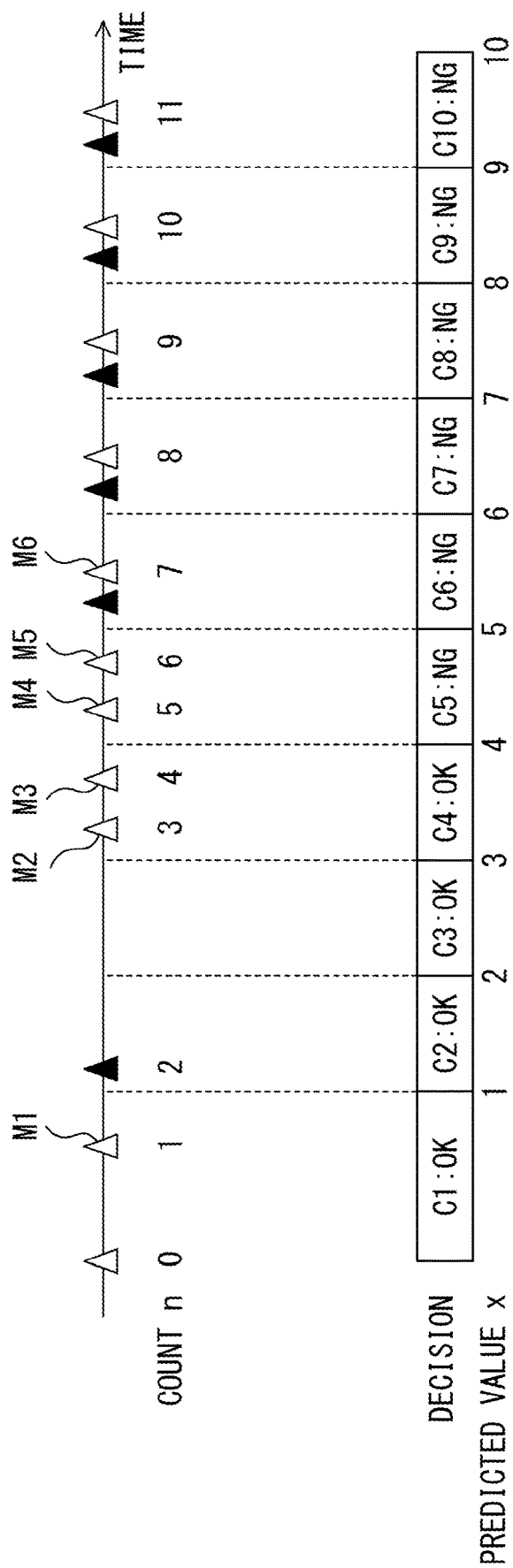
F I G. 12

DEVICE AND METHOD FOR DETECTING ATTACK IN NETWORK

CROSS-REFERENCE TO RELATED APPLICATION

This application is based upon and claims the benefit of priority of the prior Japanese Patent Application No. 2017-127819, filed on Jun. 29, 2017, the entire contents of which are incorporated herein by reference.

FIELD

The embodiments discussed herein are related to a device and a method for detecting an attack in a network.

BACKGROUND

A network technology called a CAN (Controller Area Network) may be used in an on-board network of a vehicle. An ECU (Electronic Control Unit) is implemented in each node in a network using the CAN.

Identification information (ID) is attached to a message transmitted from an ECU. This message is broadcast to ECUs in the network. Here, each ECU knows an ID of a message to be obtained by itself. Each ECU checks an ID of a received message so as to obtain a message to be obtained.

In a CAN system having the configuration described above, a malicious third party may take control of an ECU, and a malicious message may be output from the ECU so that an attack occurs in the system. For example, an ID used in the CAN system is attached to the malicious message. Then, an ECU that receives the message may perform an unintended process.

In CAN systems, many ECU output a message in a specified cycle. Thus, when a cycle in which a message is output is known, each ECU can detect a malicious message by comparing an expected arrival time of a message with an actual arrival time of the message.

A method has been proposed that verifies, when a data frame is received that does not comply with a specified rule related to a transmission cycle of a data frame, a specified identifier in the received data frame, so as to decide whether the received data frame is transmitted for an attack (for example, International Publication Pamphlet No. WO 2015/170451).

In the CAN system described above, messages may be simultaneously output from a plurality of ECUs. Here, the messages are broadcast. Thus, a degree of priority is given to each of the messages in order to avoid message collisions. This degree of priority is represented by an ID attached to each message. When messages are simultaneously output from a plurality of ECUs, a low-priority message is transmitted after a transmission of a high-priority message is completed. Thus, the transmission timing of a low-priority message may be delayed.

As described above, in a CAN system, a message may be delayed. Thus, there is a possibility that a malicious message will not be detected even if an expected arrival time of a message is compared with an actual arrival time of the message. For example, if the transmission timing of a normal message is delayed, the delayed normal message may be decided to be a malicious message. In other words, the attack detection accuracy may be decreased in an environment in which the transmission timing of a message is delayed.

SUMMARY

According to an aspect of the present invention, an attack detection device includes: a receiver configured to receive messages that are periodically transmitted from a communication device in a network; and a processor. The processor predicts a number of messages to be received by the receiver in a specified monitor range based on a transmission cycle of the messages so as to generate a predicted value. The processor counts a number of messages received by the receiver in the specified monitor range so as to generate a count value. The processor detects an attack in the network according to a result of a comparison between the predicted value and the count value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates examples of formats of frames used to transmit a message;

FIG. 4 illustrates an example of an attack detection device according to embodiments of the present invention;

FIG. 5 illustrates an example of a hardware configuration of an ECU in which the attack detection device is implemented;

FIG. 12 illustrates an example in which resetting is not performed;

DESCRIPTION OF EMBODIMENTS

Figure 1:
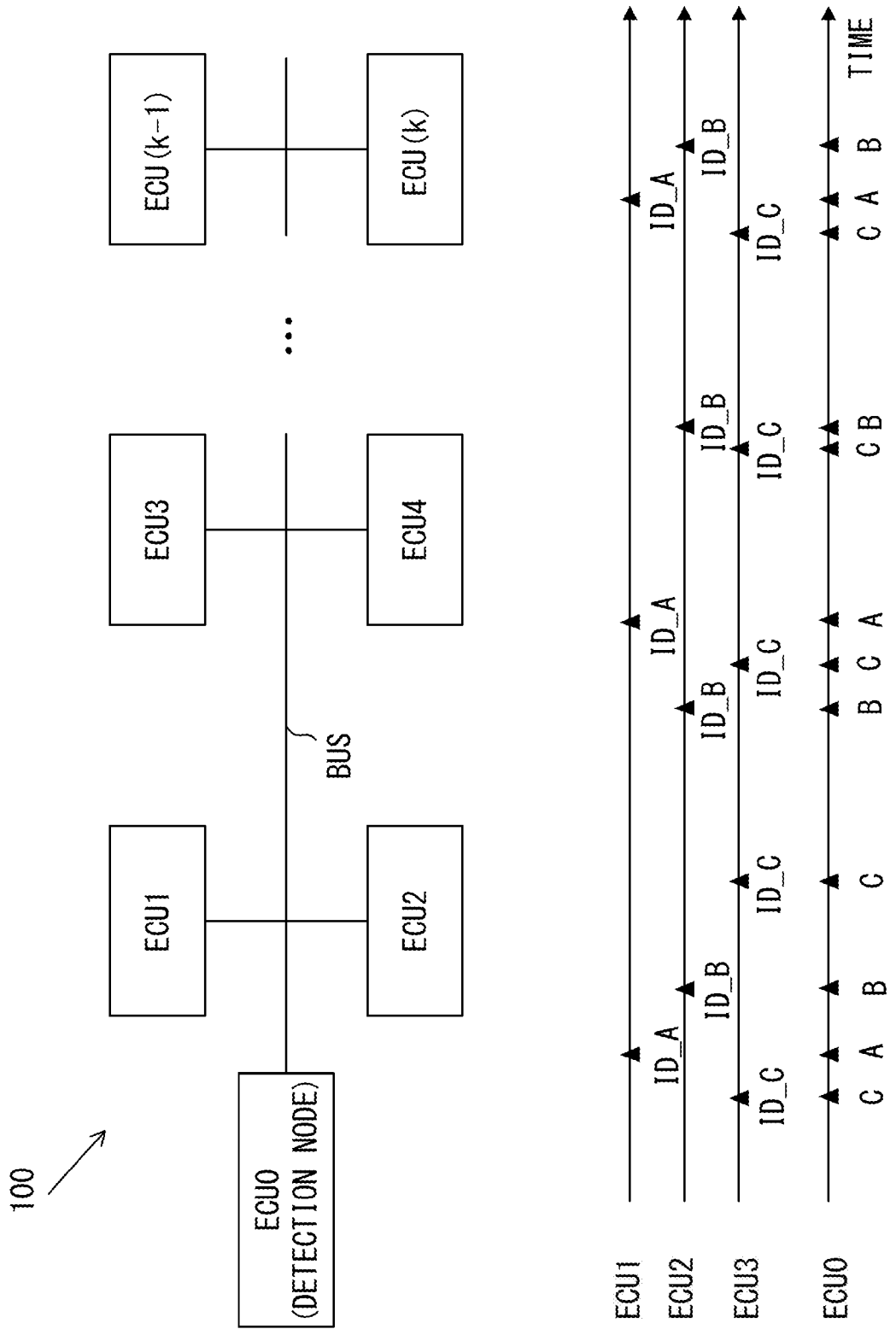
FIG. 1 illustrates an example of a network in which an attack detection device is implemented.

FIG. 1 illustrates an example of a network in which an attack detection device is implemented according to embodiments of the present invention. A network 100 illustrated in FIG. 1 includes a plurality of ECUs (ECU 0 to ECU k). The plurality of ECUs are connected to one another through a bus. In this example, the plurality of ECUs configure a CAN (controller area network) system.

Each ECU can transmit a message through a bus. This message is broadcast to all of the ECUs in the network 100. In this case, the message also arrives at the source node of the message. Identification information (ID) is attached to each message. Here, each ECU knows an ID of a message to be obtained by itself. Each ECU checks an ID of a received message so as to obtain a message to be obtained. Note that each ECU is an example of a "communication device".

In the network 100 described above, an attack detection device is implemented in one of the plurality of ECUs. In the example illustrated in FIG. 1, it is assumed that an attack detection device is implemented in the ECU 0. The attack detection device detects an attack in the network 100. In other words, the attack detection device detects a malicious message in the network 100.

At least one of the ECU 1 to the ECU k includes a function that transmits messages in a specified transmission cycle. In the example illustrated in FIG. 1, the ECU 1 transmits messages including ID_A in a specified transmission cycle, the ECU 2 transmits messages including ID_B in a specified transmission cycle, and the ECU 3 transmits messages including ID_C in a specified transmission cycle. Here, the transmission cycle of a message is determined for each ID in advance. For example, messages to which ID=0x123 is attached are transmitted at 10-ms intervals, and messages to which ID=0x456 is attached are transmitted at 20-ms intervals.

In an on-board network of a vehicle, a plurality of ECUs are used to control the vehicle. For example, a message to which ID=0x123 is attached transmits data that represents an accelerator position, and a message to which ID=0x456 is attached transmits data that represents an angle of a depressed brake pedal.

As described above, each message transmitted in the network 100 is broadcast. Thus, every message arrives at all of the ECUs. The timing chart of FIG. 1 indicates a state in which messages transmitted from the ECU 1 to ECU 3 arrive at the ECU 0.

FIG. 2 illustrates examples of formats of frames used to transmit a message. F1 represents an example of a format of a frame of a standard configuration, and F2 represents an example of a format of a frame of an extended configuration.

The frame F1 of a standard configuration includes an SOF (start of frame), an arbitration field, a control field, a data field, a CRC field, an ACK field, and an EOF (end of frame). The arbitration field includes an ID and an RTR (remote transmission request). The ID represents identification information used to identify a message. The control field includes an IDE (identifier extension), a reservation bit, and a DLC (data length code). The CRC field includes a CRC sequence and a CRC delimiter. The ACK field includes an ACK slot and an ACK delimiter. The value given to each information element in FIG. 2 represents a bit length. For example, the length of the ID is 11 bits, and the length of the data field is a variable between 0 and 64 bits.

As in the case of the frame F1 of a standard configuration, the frame F2 of an extended configuration also includes an SOF, an arbitration field, a control field, a data field, a CRC field, an ACK field, and an EOF. However, in the extended configuration, identification information is represented with a greater number of bits.

In the following description, it is assumed that a message is transmitted using a frame of a standard configuration. However, an attack detection method according to the embodiments of the present invention is also applicable when a message is transmitted using a frame of an extended configuration. Further, it is also applicable to a standard that is called CAN-FD.

Figure 3A:
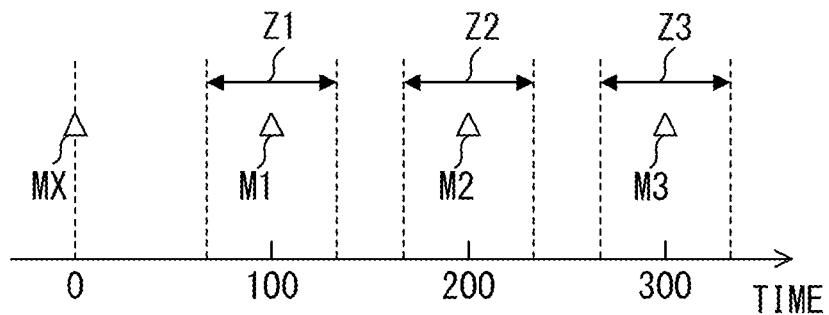
FIGS. 3A and 3B illustrate an example of an attack detection method.
Figure 3B:
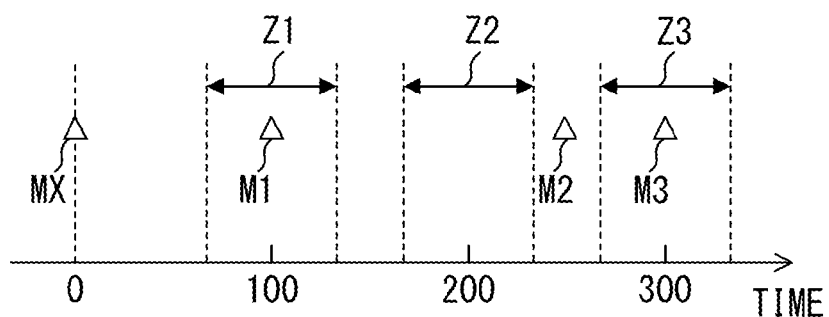

FIGS. 3A and 3B illustrate an example of an attack detection method. In this example, it is assumed that messages including an ID of a detection target are transmitted at 100-ms intervals. When an attack detection device receives a reference message MX, the attack detection device sets a monitor section. The acceptable range for each monitor section is ±40 ms. In other words, with respect to the reception time of the reference message MX, a monitor section Z1 is set to 100±40 ms, a monitor section Z2 is set to 200±40 ms, and a monitor section Z3 is set to 300±40 ms.

In the example illustrated in FIG. 3A, messages M1, M2, and M3 that follow the reference message MX are respectively detected in the monitor sections Z1, Z2, and Z3. In this case, the attack detection device decides that all of the messages M1 to M3 are normal messages. An ID of a detection target is attached to each of the messages M1 to M3.

In the example illustrated in FIG. 3B, the transmission timing of the message M2 is delayed, and the message M2 is detected outside of the monitor section Z2. In this case, the attack detection device decides that the message M2 is a malicious message (an attack message). In other words, when the transmission timing of a message is delayed, the attack detection device may decide that an attack in a network has occurred even if the attack detection device received a normal message.

An attack detection device according to the embodiments of the present invention has a function that solves or mitigates the problem described above. In other words, the attack detection device according to the embodiments of the present invention has a function that suppresses effects due to a delay of a transmission timing of a message to be transmitted periodically, so as to improve the accuracy of an attack detection. The attack detection according to the embodiments is applicable not only to a delay that is not greater than one transmission cycle, but also to a delay that is greater than one transmission cycle.

FIG. 4 illustrates an example of the attack detection device according to the embodiments of the present invention. As illustrated in FIG. 4, an attack detection device 1 includes a receiver 2, a prediction unit 3, a counter 4, a detector 5, and a reset controller 6. The receiver 2 receives a message periodically transmitted from an ECU implemented in the network 100. The attack detection device 1 can detect a reception time of a message for each ID attached to a message. The reception time of a message is detected, for example, using a timer (not illustrated) implemented in the attack detection device 1. Alternatively, the attack detection device 1 may detect a reception time from time stamp information attached to a message.

The prediction unit 3 sets a monitor range for a detection-target ID. Based on the transmission cycle of the detection-target ID, the prediction unit 3 predicts the number of messages expected to be received by the receiver 2 within a monitor range. The counter 4 counts the number of messages received by the receiver 2 within the monitor range. The detector 5 compares a predicted value obtained by the prediction unit 3 with a count value obtained by the counter 4, and detects an attack occurring in the network 100 according to a result of the comparison. For example, when the count value obtained by the counter 4 is greater than the predicted value obtained by the prediction unit 3, the detector 5 decides that the network 100 has been attacked. When a specified condition is satisfied, the reset controller 6 resets the predicted value obtained by the prediction unit 3 and the count value obtained by the counter 4. Here, the reset controller 6 sets a next monitor range.

FIG. 5 illustrates an example of a hardware configuration of an ECU in which the attack detection device 1 is implemented. In this example, an ECU 10 includes a CAN transceiver 11, a CAN controller 12, and a processing circuit 13. The processing circuit 13 includes a processor 14 and a memory 15.

The CAN transceiver 11 has a function that transmits and receives the frames illustrated in FIG. 2. The CAN controller 12 extracts data from a received frame and detects a reception time. The CAN controller 12 may perform a CRC check for the received frame. Further, the CAN controller 12 stores data in a transmission frame. The processor 14 detects an attack by executing a program stored in the memory 15. In this case, a program describing functions of the prediction unit 3, the counter 4, the detector 5, and the reset controller 6 illustrated in FIG. 4 is stored in the memory 15. Then, the processor 14 provides the functions of the prediction unit 3, the counter 4, the detector 5, and the reset controller 6 by executing this program. The receiver 2 is implemented by, for example, the CAN transceiver 11.

First Embodiment

An attack detection device according to a first embodiment is implemented in the ECU 0 illustrated in FIG. 1 and detects a malicious message (an attack message) that attacks the network 100. In this example, it is assumed that a message to which a detection-target ID is attached is transmitted in a specified transmission cycle. It is also assumed that the following communication is performed in the network 100.
(1) The transmission of a message may be delayed with respect to a scheduled transmission time, but there will not be a loss of a message. There may be a delay that is greater than one transmission cycle.
(2) Even when a delay has occurred, a total number of messages is not changed because a corresponding message is transmitted later.
(3) A message is not transmitted before a scheduled transmission time (However, a message may be transmitted just before a scheduled transmission time).

Figure 6:
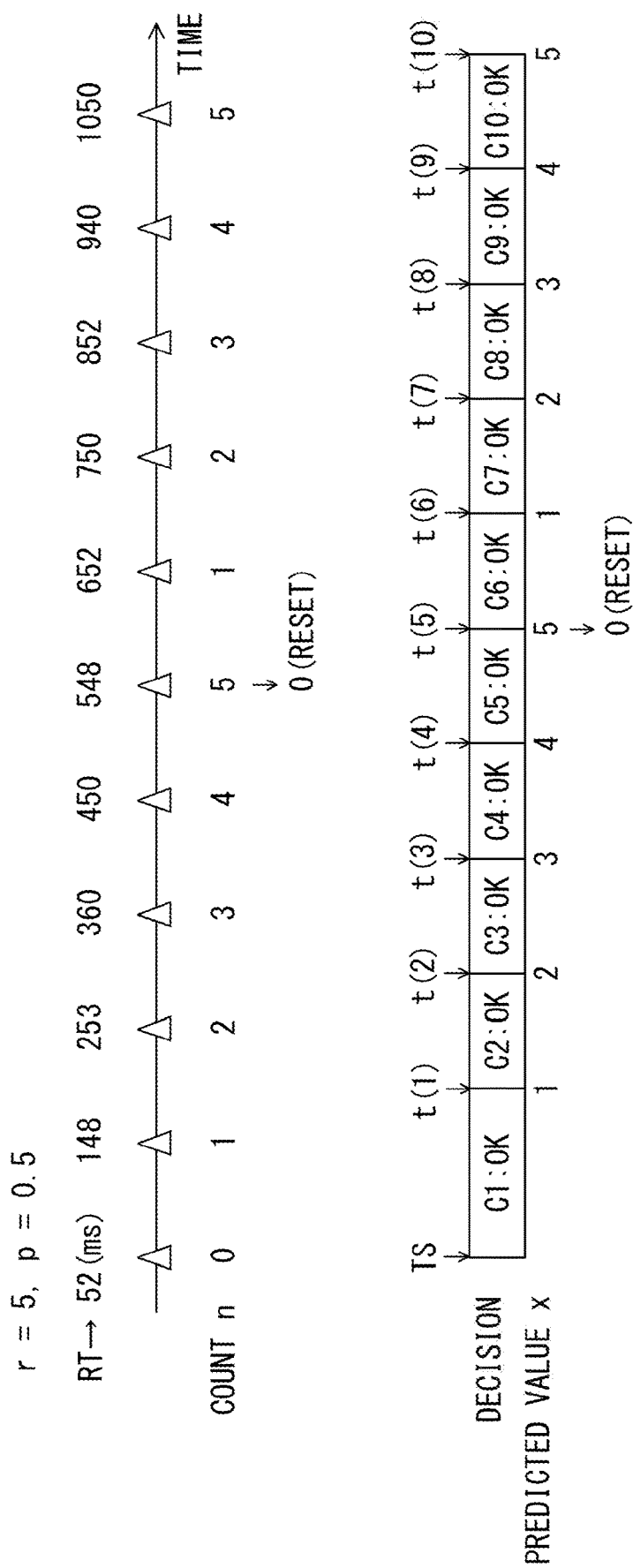
FIG. 6 illustrates an example of an attack detection method according to a first embodiment.

FIG. 6 illustrates an example of an attack detection method according to the first embodiment. In the following description, the "message" is referred to as a message to which a detection-target ID is attached, unless otherwise indicated. A symbol A represents a timing at which a normal message is received by the receiver 2.

In FIG. 6, a count value n represents the number of messages received by the receiver 2, and the count is performed by the counter 4. A predicted value x represents the number of messages expected to be received by the receiver 2 within a monitor range, and is calculated by the prediction unit 3.

The prediction unit 3 determines a monitor range based on a transmission cycle TC of a message. The monitor range is determined with respect to a reception time of a reference message. For example, it is assumed that a reference message arrives at the attack detection device 1 at a time TS. In this case, the monitor range is determined with respect to the time TS. The monitor range includes at least one count section. For example, a monitor range TS-t(1) is constituted of a count section C1. A monitor range TS-t(2) is constituted of the count sections C1 and C2. A monitor range TS-t(5) is constituted of the count sections C1-C5. The length of each count section is the same as the length of the transmission cycle TC. However, the length of a first count section is obtained by multiplying the transmission cycle TC by "1+p". A timing parameter p is a real number that is greater than zero and less than one. Here, for example, the timing parameter p is determined such that, when a message is transmitted in the transmission cycle TC without any delay, the receiver 2 receives a corresponding message in the middle of each count section. In this case, the value of the timing parameter p is 0.5.

The monitor range is determined with respect to a reception time of a reference message. For example, it is assumed that a reference message arrives at the attack detection device 1 at the time TS. In this case, an end time t(i) of the monitor range is represented by the following formula.

$$t(i)=TS+(i+p)TC$$

i is a natural number. For example, an end time t(1) of the first monitor range is represented by TS+1.5TC, and an end time t(2) of the second monitor range is represented by TS+2.5TC.

The prediction unit 3 predicts the number of messages expected to be received by the receiver 2 within a monitor range. In other words, a predicted value x is generated for a monitor range. In this example, "1" is calculated as a predicted value x for the first monitor range (from the time TS to the time t(1)), and "2" is calculated as a predicted value x for the second monitor range (from the time TS to the time t(2)). Likewise, "i" is calculated as a predicted value x for the i-th monitor range (from the time TS to the time t(i)).

The detector 5 decides whether an attack message has been input to the network 100 at an end time of each monitor range. It is assumed that, as in the case of a normal message, a detection-target ID is attached to an attack message.

The detector 5 compares a predicted value x with a count value n at an end time t(1) of the first monitor range. In the example illustrated in FIG. 6, the receiver 2 receives one message within the first monitor range. The predicted value x corresponding to the first monitor range is 1. In other words, the count value n is not greater than the predicted value x. In this case, the detector 5 decides that the network 100 has not been attacked. "OK" in FIG. 6 indicates a state in which an attack has not been detected.

Next, the detector 5 compares the predicted value x with the count value n at an end time t(2) of the second monitor range. In the example illustrated in FIG. 6, the receiver 2 receives one message between the time t(1) and the time t(2), and the count value n is incremented from 1 to 2. The predicted value x corresponding to the second monitor range is 2. In other words, the count value n is not greater than the predicted value x. In this case, the detector 5 decides that the network 100 has not been attacked.

Likewise, the detector 5 decides whether an attack message has been input to the network 100 at an end time of each monitor range. Here, the detector 5 resets the predicted value x and the count value n regularly in order to overcome the accumulation of an error. For example, when a cycle is 10 ms, a less-than-microsecond level of error will occur (for example, 10000.5 microseconds or 9999.8 microseconds) when the accuracy level of reception time is microsecond. This kind of error is accumulated if the reception of a message is repeated, and there is a possibility that the accumulated errors will soon become a large error that may affect an attack detection. Thus, the attack detection device 1 has a function that performs resetting regularly in order to prevent the accumulation of an error.

Specifically, when the count value n becomes greater than or equal to a specified threshold r, the predicted value x and the count value n are reset. In the example illustrated in FIG. 6, the threshold r is 5. When the count value n becomes greater than or equal to the threshold r, the counter value n is reset to zero. The predicted value x is updated from "x" to "x-n". In the example illustrated in FIG. 6, the predicted value x is updated from "5" to "zero" in the resetting. However, the predicted value x may be updated to a value other than zero.

As described above, the attack detection device 1 compares a count value n that represents the number of messages received by the receiver 2 with a predicted value x for each monitor range. When the count value n is not greater than the predicted value x, the attack detection device 1 decides that the network 100 has not been attacked.

Figure 7:
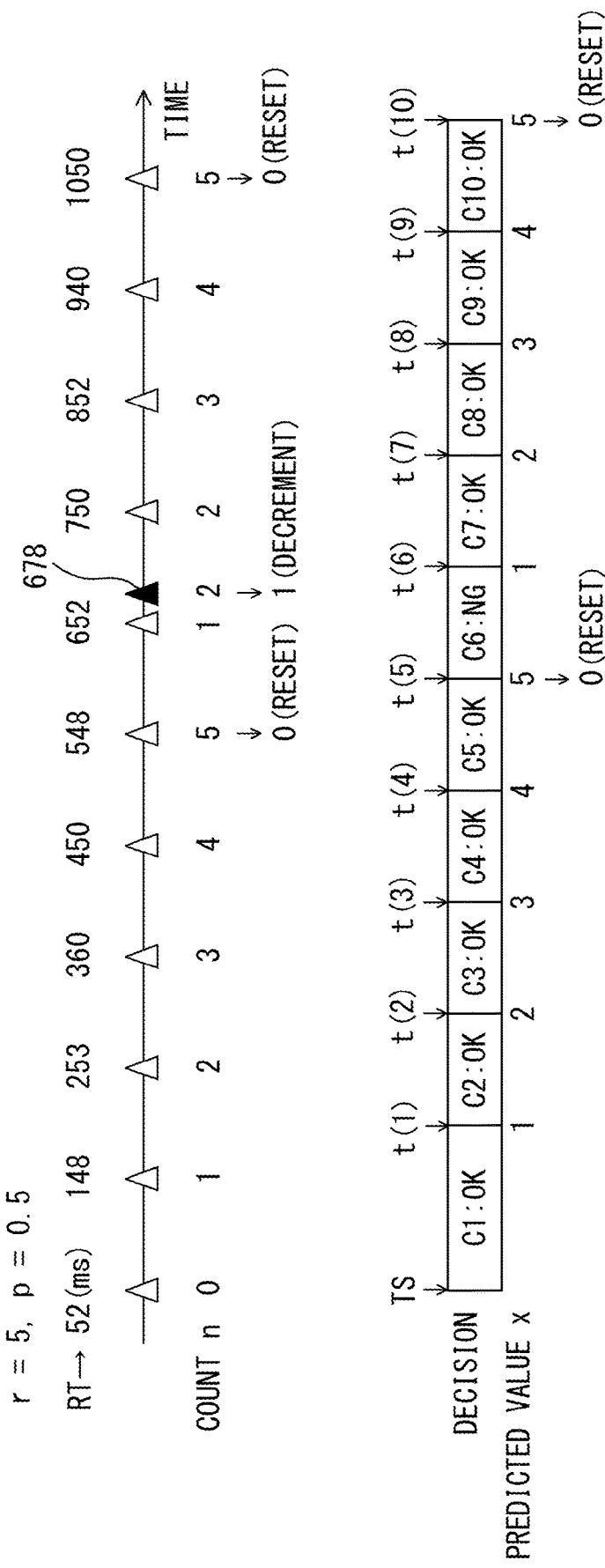
FIG. 7 illustrates another example of the attack detection method according to the first embodiment.

FIG. 7 illustrates another example of the attack detection method according to the first embodiment. In the example illustrated in FIG. 7, the receiver 2 receives an attack message in a count section C6. The attack message is represented by a symbol ▲ in FIG. 7.

In this case, the count value n and the predicted value x are both reset to zero at the end of the count section C5. After that, the receiver 2 receives a normal message and an attack message in the count section C6. In this case, the predicted value x is 1 at the end of the count section C6. On the other hand, the count value n is 2. In other words, the count value n is greater than the predicted value x. Thus, the detector 5 decides that the network 100 has been attacked. "NG" in FIG. 7 represents a state in which an attack has been detected. As described above, the attack detection device 1 compares a count value n that represents the number of messages received by the receiver 2 with a predicted value x so as to detect an attack in the network 100.

In the example described above, it is decided, at the end of each count section, whether an attack has been performed, but the present embodiment is not limited to this method. In other words, the attack detection device 1 may decide whether a value of a counter is greater than a predicted value at the time of receiving a message.

Figure 8:
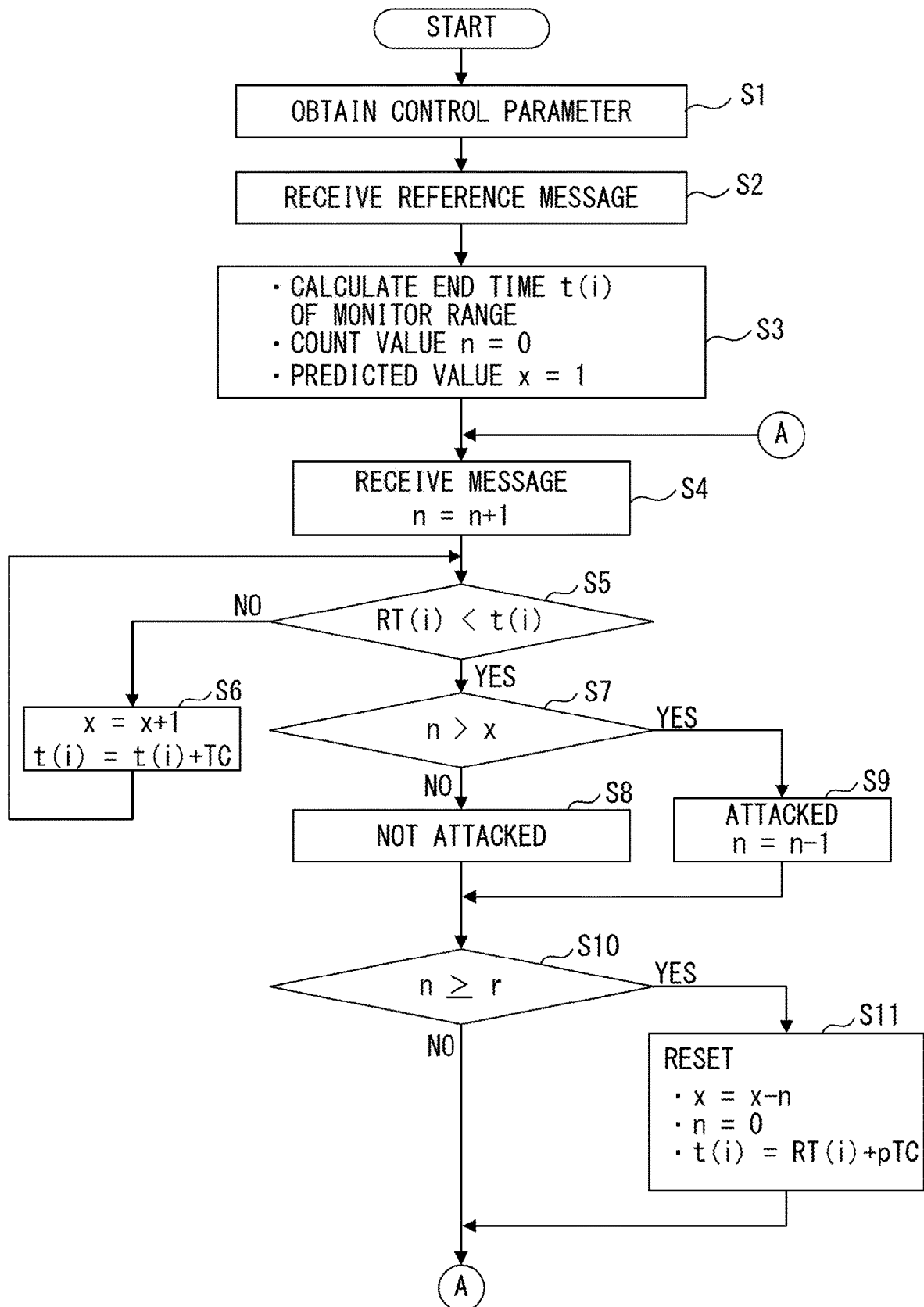
FIG. 8 is a flowchart that illustrates an example of the attack detection method according to the first embodiment.

FIG. 8 is a flowchart that illustrates an example of the attack detection method according to the first embodiment. For example, the processes of this flowchart are performed by the attack detection device 1 when a detection-target ID is specified.

In S1, the attack detection device 1 obtains control parameters. The control parameters include a transmission cycle TC of a detection-target ID, a threshold r that represents a cycle in which resetting is performed, and a timing parameter p. For example, the control parameters are stored in the memory 15 illustrated in FIG. 5 in advance. Alternatively, the control parameters are given by a user or a network administrator.

In S2, the receiver 2 receives a reference message. For example, the reference message may be a message received for the first time since the processes of the flowchart illustrated in FIG. 8 started to be performed. Here, the receiver 2 records a reception time RT(0) of the reference message.

In S3, the counter 4 initializes the count value n to zero. The prediction unit 3 calculates an end time t(i) of the first monitor range. In this example, the end time t(i) of the first monitor range is calculated by adding (1+p)×TC to the reception time RT(0) of the reference message. TC represents a transmission cycle of a detection-target ID, and p represents a timing parameter determined in advance (for example, 0.5). Further, the prediction unit 3 sets a predicted value x to 1.

In S4, the receiver 2 receives a message. Here, the receiver 2 detects a reception time RT(i) of this message. The counter 4 increments the count value n by 1.

In S5 and S6, the attack detection device 1 decides whether the reception time RT(i) of the message is before the end time t(i) of the monitor range. When the reception time RT(i) of the message is not before the end time t(i) of the monitor range, the attack detection device 1 increments the predicted value x by 1, and adds the transmission cycle TC to the end time t(i). The processes of S5 and S6 are performed repeatedly until the end time t(i) of the monitor range is after the reception time RT(i) of the message. When the end time t(i) of the monitor range is after the reception time RT(i) of the message, the process performed by the attack detection device 1 moves on to S7.

In S7 to S9, the detector 5 compares the count value n with the predicted value x. When the count value n is not greater than the predicted value x, the detector 5 decides that the network 100 has not been attacked. When the count value n is greater than the predicted value x, the detector 5 decides that the network 100 has been attacked. In this case, the counter 4 decrements the count value n by 1. In the example illustrated in FIG. 7, when an attack has been detected in the count section C6, the count value n is updated from "2" to "1". As described above, when the detector 5 decides that the received message is an attack message, the received message is not counted for the count value n. In other words, the count value n counts the number of normal messages.

When it is decided that the network 100 has been attacked, the attack detection device 1 may output an alarm signal. The alarm signal reports to a user that the network 100 has been attacked. Here, the attack detection device 1 may disconnect the network 100 from an external network. When the network 100 is an on-board network of a vehicle, the attack detection device 1 may output a control signal to stop the vehicle.

In S10, the reset controller 6 compares the count value n with the threshold r that represents a cycle in which resetting is performed. When the count value n is less than the threshold r, the process performed by the attack detection device 1 returns to S4. When the count value n is not less than the threshold r, the reset controller 6 performs a resetting process of S11. In the resetting process, the predicted value x is updated from "x" to "x-n". The count value n is reset to zero. RT(i)+p×TC is set to be an end time t(i) of a next monitor range. RT(i) represents a reception time of a message most recently received by the receiver 2. TC represents a transmission cycle of a detection-target ID and p represents a timing parameter. After that, the process performed by the attack detection device 1 returns to S4.

In the attack detection method described above, when, in addition to a normal message, an attack message is input to the network 100, the count value n that represents the number of received messages is expected to be greater than the predicted value x. In this case, a result of the decision performed in S7 is "Yes", so an attack in the network 100 has been detected.

For example, in the example illustrated in FIG. 7, the receiver 2 receives a normal message and an attack message in the count section C6. Here, the count value n is 2 and the predicted value x is 1 at an end time t(6) of the count section C6. In other words, the count value n is greater than the predicted value x. In this case, the detector 5 decides, in S7 to S9 of FIG. 8, that the network 100 has been attacked. Here, the counter 4 decrements the count value n by 1 in S9. In the example illustrated in FIG. 7, when the receiver 2 receives an attack message, the count value n is increased from 1 to 2 in S4, but the count value n is then decremented from 2 to 1 in S9. Thus, when the receiver 2 receives a next message, the count value n is 2, as illustrated in FIG. 7. As described above, the count value n is not increased due to a reception of an attack message. In other words, the count value n is actually indicates the number of normal messages.

As indicated in S6, when a reception time RT(i) of a message is after an end time t(i) of a count section, the predicted value x is incremented by the process of S6 being performed at the time of receiving the message. Alternatively, the predicted value x may be incremented at an end time t(i) of each monitor range. As described above, the end time t(i) of each monitor range depends on a timing parameter p. Thus, the timing at which the predicted value x is incremented depends on a timing parameter p. In other words, the timing parameter p specifies the timing at which the predicted value x is incremented. Specifically, the timing parameter p is determined such that an ideal reception time of a periodically transmitted message is substantially in the middle of each count section. Thus, in general, it is preferable that the timing parameter p be 0.5, but the timing parameter may be set such that the reception time of a periodically transmitted message is in the first half or in the latter half of each count section depending on the state of a network.

The process of S6 may be performed when the reception time RT(i) of a message is the same as or before the end time t(i) of a monitor range in S5. Further, the attack detection device 1 can detect an attack for each of a plurality of detection-target IDs. In this case, the attack detection device 1 may perform the processes of the flowchart illustrated in FIG. 8 in parallel.

Second Embodiment

In the attack detection method according to the first embodiment, if an attack message is input when the resetting process of S11 in FIG. 8 is performed, the detection accuracy may be decreased after resetting is performed. In order to solve this problem, a condition for performing the resetting is added in a second embodiment.

Figure 9:
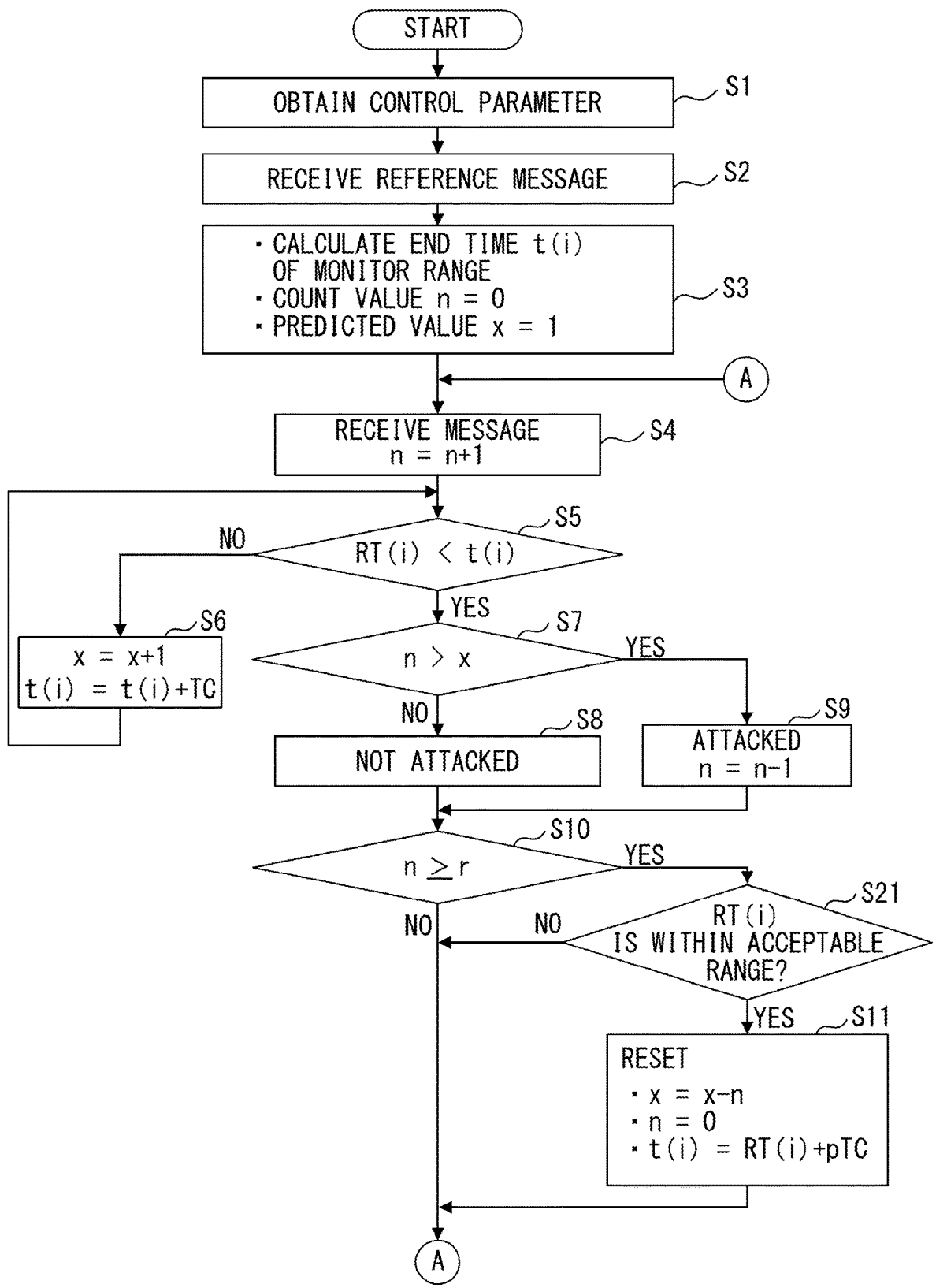
FIG. 9 is a flowchart that illustrates an example of an attack detection method according to a second embodiment.

FIG. 9 is a flowchart that illustrates an example of an attack detection method according to the second embodiment. The processes of an attack detection method are substantially the same in the first embodiment and the second embodiment. However, in the second embodiment, the attack detection device 1 obtains, in S1, information indicating an acceptable range for a target reception time described later, in addition to the transmission cycle TC, the threshold r, and the timing parameter p. Further, in the attack detection method according to the second embodiment, the process of S21 is performed in addition to the processes of S1 to S11 of FIG. 8. The process of S21 is performed when the count value n is greater than or equal to the threshold r.

In S21, the reset controller 6 decides whether the reception time RT(i) of the message received in S4 is within an acceptable range for a target reception time. The target reception time represents an ideal reception time of a message. The ideal reception time is in the middle of each count section. For example, in the example illustrated in FIG. 6, a start time t(4) and an end time t(5) of the count section C5 are calculated using the following formulas. It is assumed that the transmission cycle TC is 100 ms and the timing parameter p is 0.5.

$$t(4)=52+4.5\times100=502$$

$$t(5)=52+5.5\times100=602$$

In this case, the target reception time for the count section C5 is 552 ms. Alternatively, the target reception time for the count section C5 may be calculated by subtracting "p×TC" from the end time of the count section C5.

The acceptable range for a target reception time is, for example, the target reception time ±20 percent of the transmission cycle TC, although it is not particularly limited to this example. In this case, the acceptable range for the count section C5 is between 532 ms and 572 ms. When the reception time RT(i) of the message received in S4 is within the acceptable range for the target reception time, the reset controller 6 performs the resetting process of S11. When the reception time RT(i) is outside of the acceptable range, the resetting process of S11 is skipped.

As described above, in the second embodiment, when the count value n is greater than or equal to the threshold r and the reception time of a message is close to a target reception time, resetting is performed. Here, when the reception time of a message is close to a target reception time, the message is more likely to be a normal message. Thus, according to the second embodiment, it is possible to prevent resetting from being performed due to an attack message, or to reduce the number of resetting performed due to an attack message. This results in improving the detection accuracy of the attack detection device 1.

Third Embodiment

Figure 10:
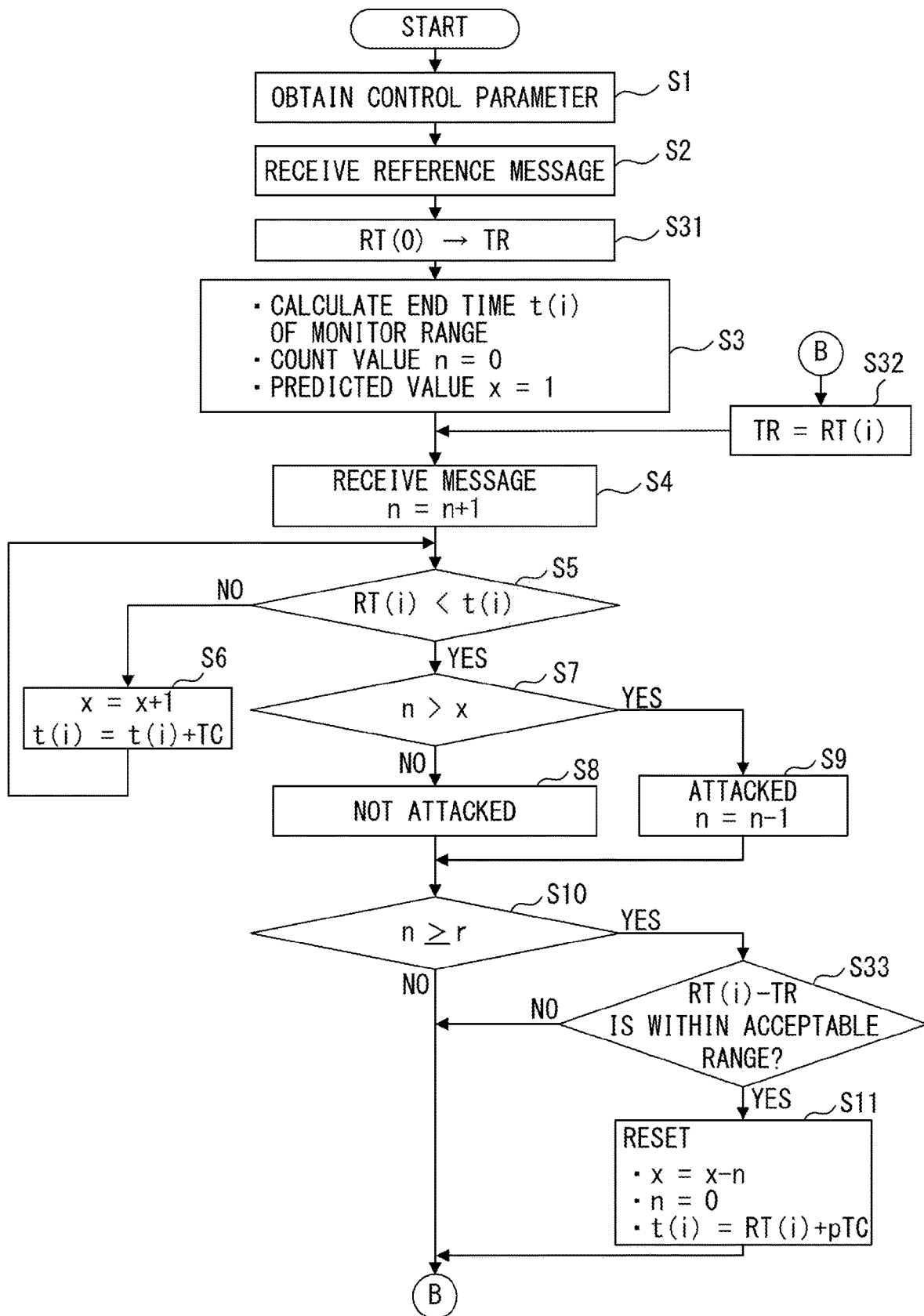
FIG. 10 is a flowchart that illustrates an example of an attack detection method according to a third embodiment.

FIG. 10 is a flowchart that illustrates an example of an attack detection method according to a third embodiment. In the second embodiment, the resetting process is controlled according to whether the arrival time of a received message is within the acceptable range for a target reception time. In the third embodiment, the resetting process is controlled according to the difference between the reception times of two most recently received messages. As in the case of the second embodiment, the attack detection device 1 obtains, in S1 of the third embodiment, information indicating an acceptable range, in addition to the transmission cycle TC, the threshold r, and the timing parameter p. Further, in the attack detection method according to the third embodiment, the processes of S31 to S33 are performed in addition to the processes of S1 to S11 of FIG. 8.

In the third embodiment, the process of S31 is performed when the receiver 2 receives a reference message in S2. In S31, the reception time RT(0) of the reference message is recorded as a reference time TR. For example, in the example illustrated in FIG. 6, the receiver 2 receives a reference message at a time 52 ms. In this case, "52 ms" is recorded as a reference time TR.

The process of S32 is performed when the processes (S5 to S11, S33) for a received message have been performed. In S32, the reset controller 6 records a reception time RT(i) of a most recently received message as a reference time TR. Here, the reference time TR is updated from an already recorded reception time to a reception time of a newly received message. The process of S32 is performed regardless of whether an attack message has been detected.

The process of S33 is performed when the count value n is greater than or equal to the threshold r. In S33, the reset controller 6 decides whether the difference between the reception times of two messages most recently received by the receiver 2 is within a specified acceptable range. This difference is calculated by subtracting a reference time TR from a reception time RT(i). The acceptable range is, for example, ±20 percent of the transmission cycle TC of a detection-target ID. In this case, the acceptable range is between 0.8TC and 1.2TC.

In the example illustrated in FIG. 6, the receiver 2 receives a message at a time 450 ms. Then, in S32, "450" is recorded as a reference time TR. Subsequently, the receiver 2 receives a new message at a time 548 ms. Here, the process of S33 is performed because the count value n (n=5) reaches the threshold r (r=5). It is assumed that the transmission cycle TC of a detection-target ID is 100 ms and the acceptable range is between 80 ms and 120 ms. In this case, the difference between the reception times of the above two messages is 98 ms, which is within the acceptable range. Thus, the resetting process of S11 is performed. In other words, the count value n and the predicted value x are reset.

Figure 11:
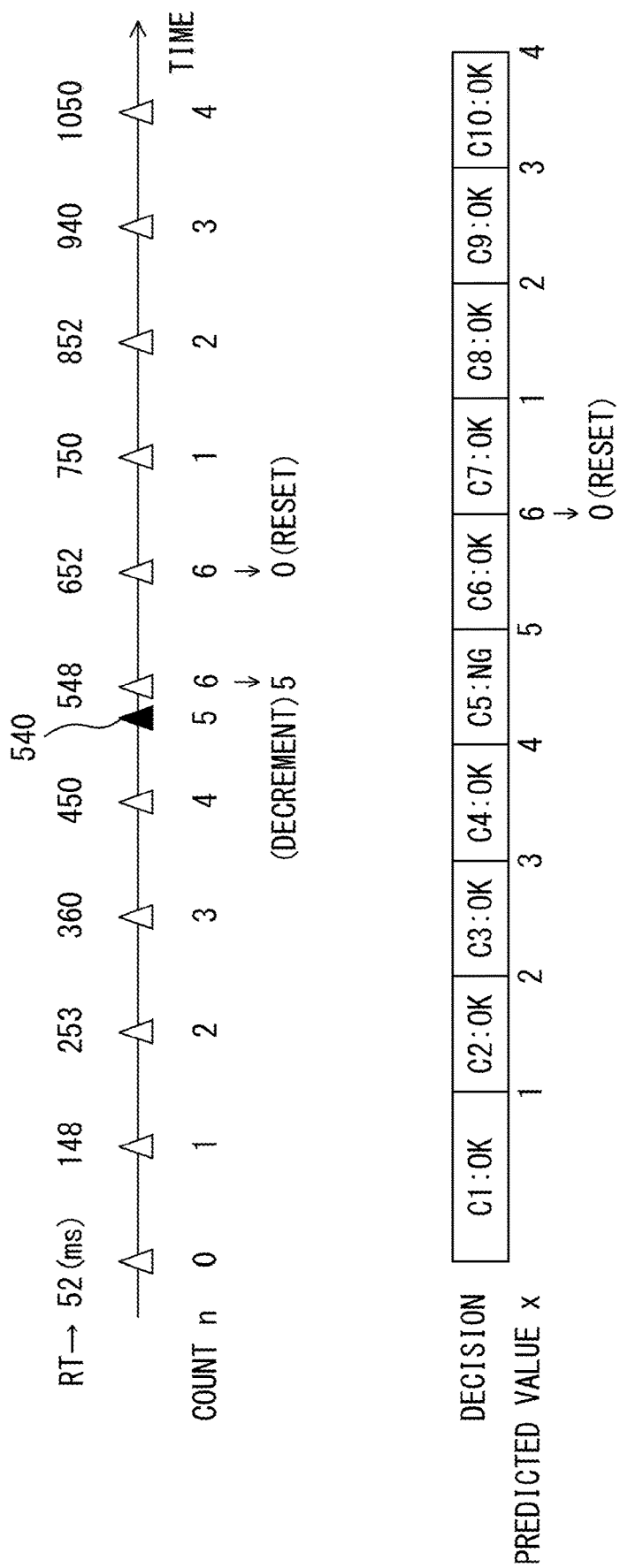
FIG. 11 illustrates an example of the attack detection method according to the third embodiment.

In the example illustrated in FIG. 11, in S32, "540" is recorded as a reference time TR for a message (here, an attack message) received at a time 540 ms. When the receiver 2 receives a message at a time 548 ms, the process of S33 is performed because the count value n (n=6) is greater than the threshold r (r=5). However, the difference between the reception times of the above two messages is 8 ms, which is outside of the acceptable range. In this case, the resetting process of S11 is not performed. In other words, the count value n and the predicted value x are not reset. The reference time TR is then updated from "540" to "548" in S32.

When the receiver 2 receives a message at a time 652 ms, the process of S33 is performed because the count value n reaches the threshold r. Here, the difference between the reception times of the above two messages is 104 ms, which is within the acceptable range. In this case, the resetting process of S11 is performed. In other words, the count value n and the predicted value x are reset.

As described above, in the third embodiment, it is decided whether the difference between the reception times of two messages most recently received by the receiver 2 is substantially the same as the transmission cycle TC. When this difference is very different from the transmission cycle TC, it has been decided that an attack message has been received, and the resetting process is not performed. This results in preventing the operation of an attack detection algorithm from becoming unstable.

Fourth Embodiment

As described above, the attack detection device 1 determines a monitor range based on the transmission cycle TC of a detection-target ID, and compares the number of messages received within the monitor range with its predicted value, so as to detect an attack message. Here, the attack detection device 1 detects an attack on the assumption that one normal message is received in one count section.

However, each device has an error. For example, a transmission source ECU may transmit a message at 99.99-ms internals when the transmission cycle TC is 100 ms. There is a possibility that the attack detection device 1 will not detect an attack message accurately when these errors are accumulated. Alternatively, the attack detection device 1 may regard a normal message as an attack message.

This problem may be avoided by regularly resetting a count value n and a predicted value x. In other words, the attack detection accuracy may be decreased if a count value n and a predicted value x remain in a state in which they are not reset properly for some reason.

FIG. 12 illustrates an example in which resetting is not performed. In this example, an attack message arrives after a message M1. After that, a transmission delay occurs, and messages M2 to M4 arrive intensively in a short period of time. As a result, the predicted value x is 5 and the count value n is 6 at the end time of the count section C5. Thus, an attack message is detected. Here, the count value n is greater than the threshold r, so the process of S33 of FIG. 10 is performed. However, the difference (that is, RT(i)-TR) between the reception time of a message M4 and the reception time of a message M5 are significantly small with respect to the transmission cycle TC. Thus, resetting in S11 is not performed.

It is assumed that, in the count section C6, the message M6 and one attack message arrive. In this case, the count value n is incremented from 6 to 7. Specifically, the count value n is incremented from 6 to 8 by receiving two messages, but is decremented by 1 since an attack message is detected. In other words, the count value n is actually counts the number of normal messages. Thus, in FIG. 12, when an attack message is detected, only the number of normal messages is counted so as to obtain the count value n. The predicted value x is incremented by 1 from 5 to 6 at the end time of the count value C6.

In this case, the count value n is greater than the predicted value x at the end time of the count section C6. Thus, an attack message is detected. Further, the count value n is greater than the threshold r, so the process of S33 is performed. However, in this example, the difference between the reception time of the message M6 and the reception time of a message received just before the message M6 is also much smaller than the transmission cycle TC. Thus, resetting in S11 is not performed. As a result, at the end time of the count section C6, the difference between the count value n and the predicted value x is 1.

After that, when message arrive as illustrated in FIG. 12, the count value n and the predicted value x are not reset in count sections C7 to C10. If the count value n and the count value x are not reset, the detection accuracy may be decreased due to accumulated errors, as described above.

As described above, the difference between a count value n and a predicted value x may be a value other than zero during a period of time in which the count value n and the predicted value x are not reset. Thus, an attack detection device according to a fourth embodiment monitors the difference between a count value n and a predicted value x, so as to control the resetting process according to the difference.

Figure 13:
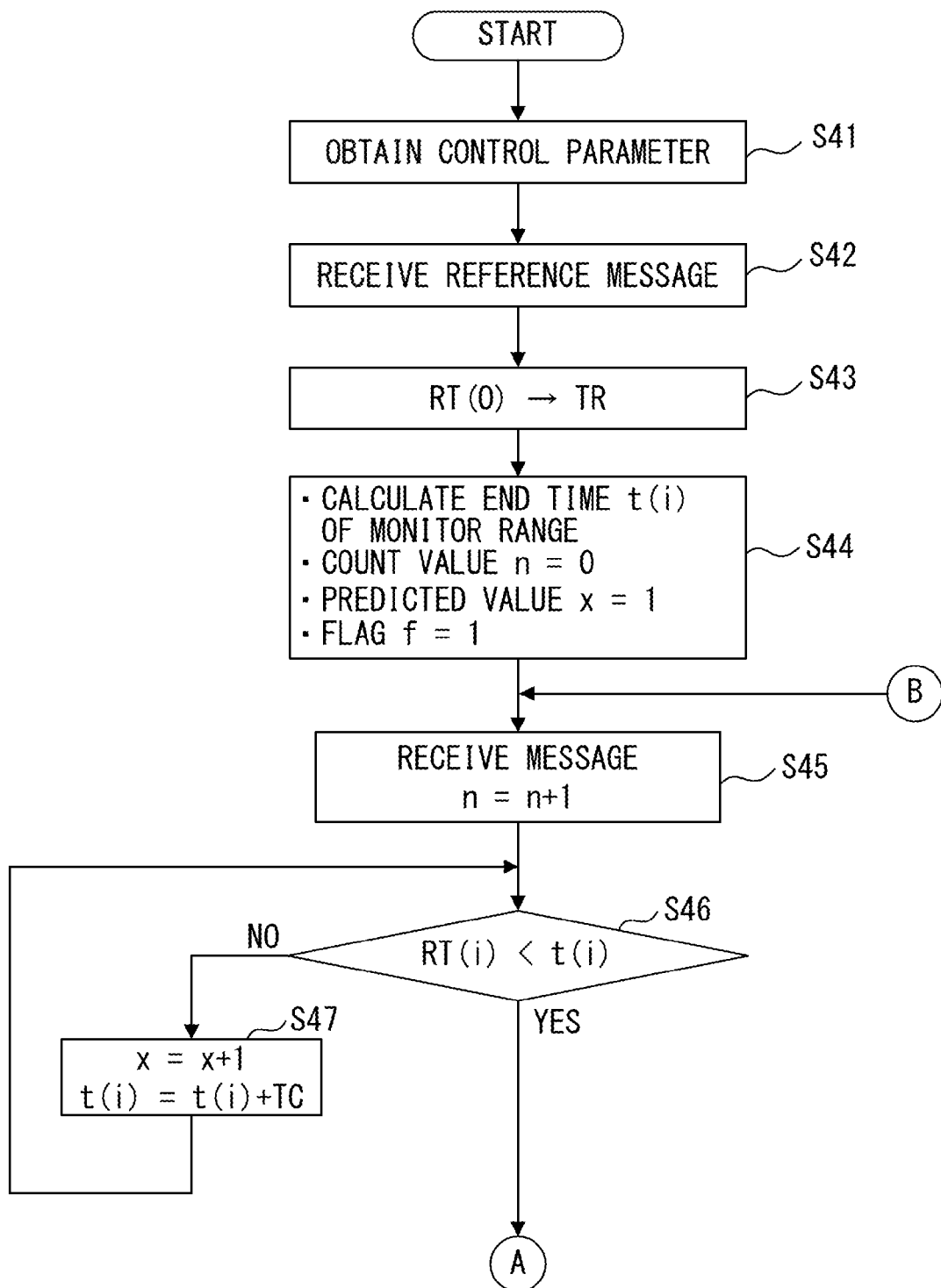
FIGS. 13 and 14 are flowcharts that illustrate an example of an attack detection method according to a fourth embodiment.
Figure 14:
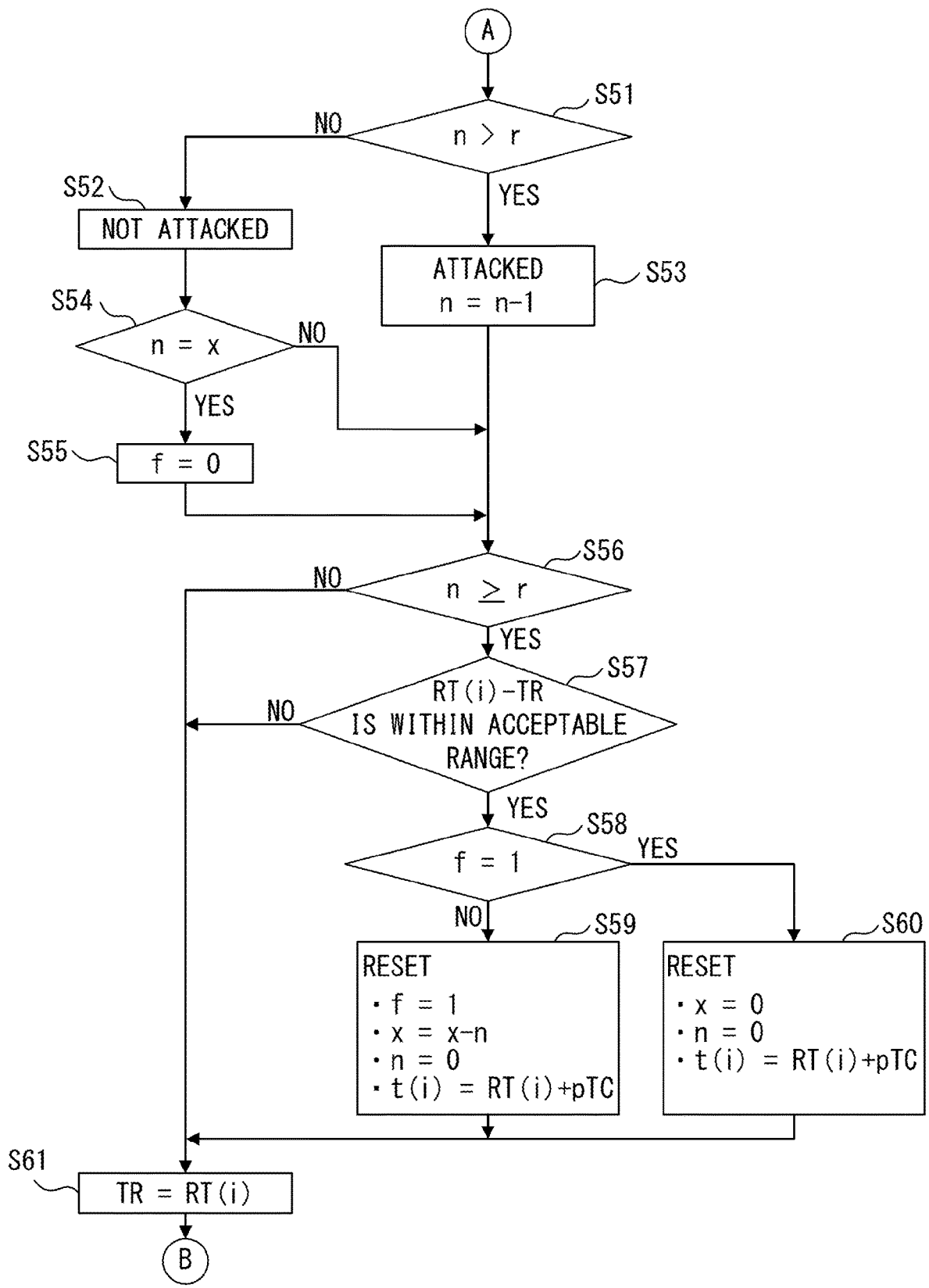

FIGS. 13 and 14 are flowcharts that illustrate an example of an attack detection method according to the fourth embodiment. The processes of S41 to S47 of the fourth embodiment are substantially the same as the processes of S1 to S6 and S31 of the first to third embodiments. However, in S44, a flag f is set to 1. The flag f indicates whether a count value n and a predicted value x are the same as each other. In this example, f=1 indicates a state in which the count value n and the predicted value x are different from each other, and f=0 indicates a state in which the count value n and the predicted value x are the same as each other.

The processes of S51 to S53 are the same as the processes of S7 to S9 of the first to third embodiments. In other words, the detector 5 compares the count value n with the predicted value x. When the count value n is not greater than the predicted value x, the detector 5 decides that the network 100 has not been attacked. When the count value n is greater than the predicted value x, the detector 5 decides that the network 100 has been attacked. In this case, the counter 4 decrements the count value n by 1.

When it has been decided that an attack has not been performed, the reset controller 6 compares the count value n with the predicted value x in S54. When the count value n and the predicted value x are the same as each other, the reset controller 6 updates the flag f to zero in S55. When the count value n and the predicted value x are different from each other, the process of S55 is skipped.

In S56, the reset controller 6 compares the count value n with the threshold r that represents a cycle in which resetting is performed. When the count value n is less than the threshold r, the process performed by the attack detection device 1 moves on to S61. When the count value n is greater than or equal to the threshold r, the reset controller 6 decides, in S57, whether the difference between the reception times of two messages most recently received by the receiver 2 is within a specified acceptable range. This difference is calculated by subtracting a reference time TR from a reception time RT(i). In this example, the acceptable range is ±20 percent of the transmission cycle TC of a detection-target ID. In other words, the acceptable range is between 0.8TC and 1.2TC.

When the difference between the reception times of the two messages is outside of the acceptable range, the process performed by the attack detection device 1 moves on to S61. When the difference between the reception times of the two messages is within the acceptable range, the reset controller 6 checks a value of the flag f in S58.

When the flag f is zero, the reset controller 6 decides that there was at least one count section, over a specified period of time, in which the count value n and the predicted value x were the same as each other. In this case, the attack detection device 1 performs a resetting process in S59. The resetting process of S59 is the same as the process of S11 of the first to third embodiments. In this example, the specified period of time corresponds to a period of time in which the receiver 2 receives r messages. When the flag f is 1, the reset controller 6 decides that there was a certain period of time, over the specified period of time described above, in which the count value n and the predicted value x were different from each other. In this case, the attack detection device 1 performs a resetting process in S60. In S60, the count value n and the predicted value x are both reset to zero.

After that, the process of S61 is performed. In S61, the reset controller 6 records the reception time RT(i) of a most recently received message as a reference time TR.

The following is a basic operation of the fourth embodiment described above.
(1) When the receiver 2 receives a message, the counter 4 increments the count value n by 1.
(2) The predicted value x is incremented by 1 in each transmission cycle TC. However, the length of a first count section is 1.5TC.
(3) When the count value n is greater than the predicted value x, the detector 5 decides that the network 100 has been attacked.

The reset controller 6 performs resetting (refresh) when the following three conditions are satisfied.
(1) The receiver 2 has received at least r messages from the most recent previous resetting process until now.
(2) The difference between the reception times of two messages most recently received by the receiver 2 is substantially the same as the transmission cycle TC (an acceptable range).
(3) The count value n and the predicted value x are the same as each other in at least one count section from the most recent previous resetting process until now.

In the resetting process, the predicted value x is updated from "x" to "x-n", and the count value n is reset to zero. Further, a time at which half the transmission cycle TC has elapsed since the reception time of a newest message is determined to be a timing at which the predicted value x is incremented next time. However, when the count value n is not the same as the predicted value x in all of the count sections from the most recent previous resetting process until now, the predicted value x is reset to zero. In this case, both the count value n and the predicted value x are set to zero, and this results in avoiding or suppressing a decrease in detection accuracy due to accumulated errors.

In the example illustrated in FIGS. 13 and 14, the attack detection device 1 may perform the process of S54 before the process of S51. In the example illustrated in FIGS. 13 and 14, whether the count value n and the predicted value x are the same as each other over a period of time in which the receiver 2 receives r messages is monitored, and this period of time may be longer than r or may be shorter than r. Further, the attack detection device 1 may skip the process of S57.

Fifth Embodiment

In the example illustrated in FIGS. 13 and 14, a state in which the count value n and the predicted value x are different from each other is monitored, and the resetting process is controlled according to a result of the monitoring. When the count value n and the predicted value x are different from each other, the difference between the count value n and the predicted value x remains unchanged in many cases. Thus, in a fifth embodiment, the attack detection device 1 monitors a state in which the difference between the count value n and the predicted value x is constantly the same value other than zero, and controls the resetting process according to a result of the monitoring.

Figure 15:
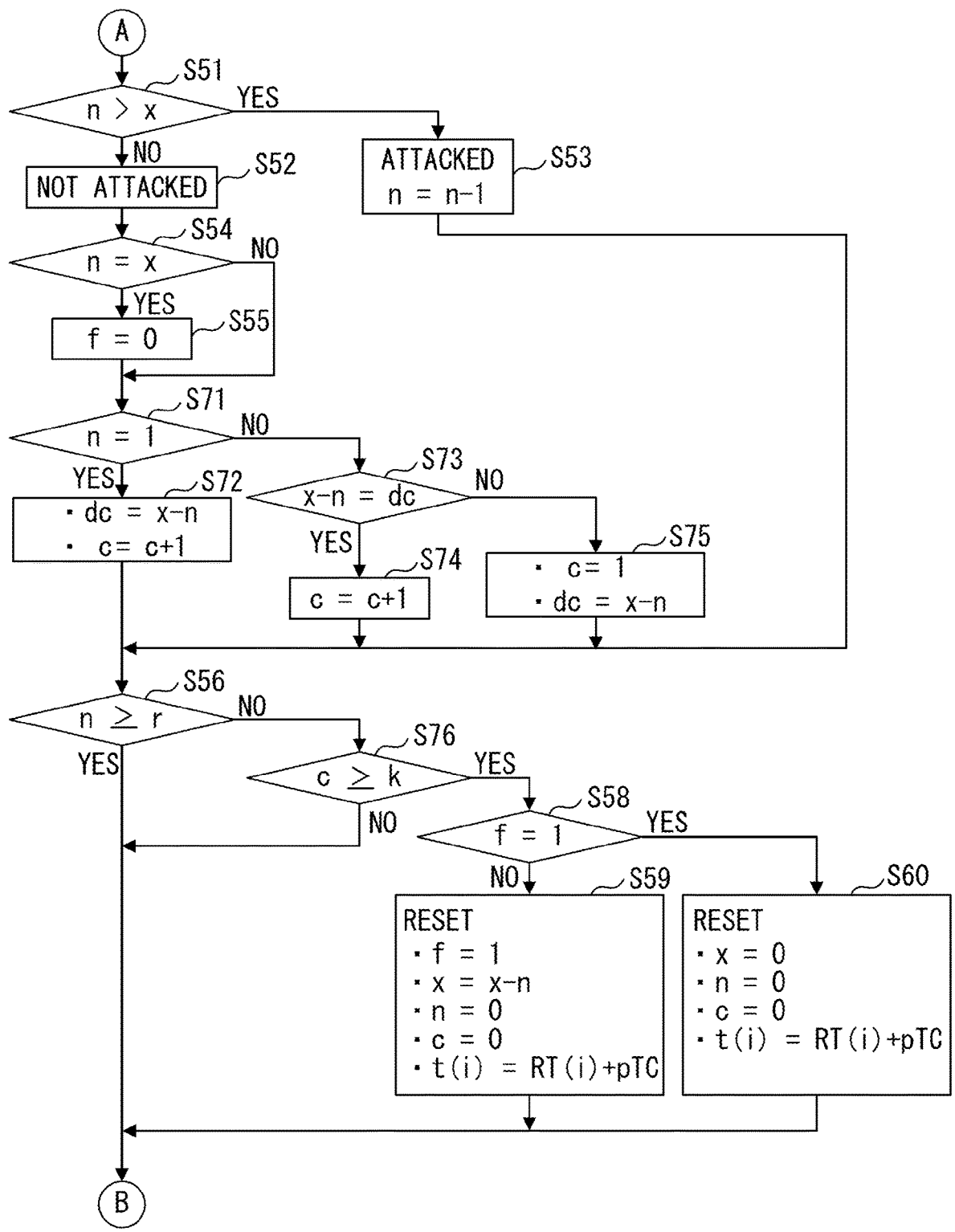
FIG. 15 is a flowchart that illustrates an example of an attack detection method according to a fifth embodiment.

FIG. 15 is a flowchart that illustrates an example of an attack detection method according to the fifth embodiment. The processes performed before the process of S51 are substantially the same in the fourth embodiment and the fifth embodiment, so their descriptions are omitted. However, in the fifth embodiment, a variable dc and a variable c are given. The variable dc represents a difference between the count value n and the predicted value x. The variable c is obtained by counting the number of segments (that is, the number of count sections) in which the variable dc remains unchanged. Further, in the attack detection method according to the fifth embodiment, the processes of S71 to S76 are performed in addition to the procedure of the fourth embodiment.

In S71, the reset controller 6 decides whether the count value n is 1. When the count value n is 1, the reset controller 6 gives the difference between the count value n and the predicted value x to the variable dc in S72. Further, the reset controller 6 increments the variable c by 1.

When the count value n is not 1, the reset controller 6 decides, in S73, whether the variable dc is the same as the difference between the count value n and the predicted value x. In other words, it is decided whether the difference between the count value n and the predicted value x has been changed. When the difference has not been changed, the reset controller 6 increments the variable c by 1 in S74. When the difference described above has been changed, the reset controller 6 resets the variable to 1 in S75. In addition, the reset controller 6 gives the difference between the count value n and the predicted value x to the variable dc.

The processes of S71 to S75 described above are performed every time the receiver 2 receives a message. If the difference between the count value n and the predicted value x remains unchanged, the variable c will be increased.

The process of S76 is performed when the count value n is greater than or equal to the threshold r. In S76, the reset controller 6 compares the variable c with a specified threshold k. When the variable c is less than the threshold k, the process performed by the attack detection device 1 returns to S45 in FIG. 13. When the variable c is not less than the threshold k, the reset controller 6 performs the resetting process of S59 or S60. In other words, resetting is performed when the count value n is greater than or equal to the threshold r and when the difference between the count value n and the predicted value x remains unchanged over a period of time that is equal to or greater than most recent k cycles. In the fifth embodiment, the variable c is reset to zero in the process of S59 or S60.

In the example illustrated in FIG. 15, whether the difference between the count value n and the predicted value x remains unchanged is monitored, but the fifth embodiment is not limited to this method. For example, whether the difference between the count value n and the predicted value x is constantly within a specified range may be monitored.

Sixth Embodiment

In the fourth and fifth embodiments, the resetting process is controlled according to the difference between the count value n and the predicted value x. In a sixth embodiment, the resetting process is controlled taking into consideration the difference between the reception times of two messages most recently received by the receiver 2.

Figure 16:
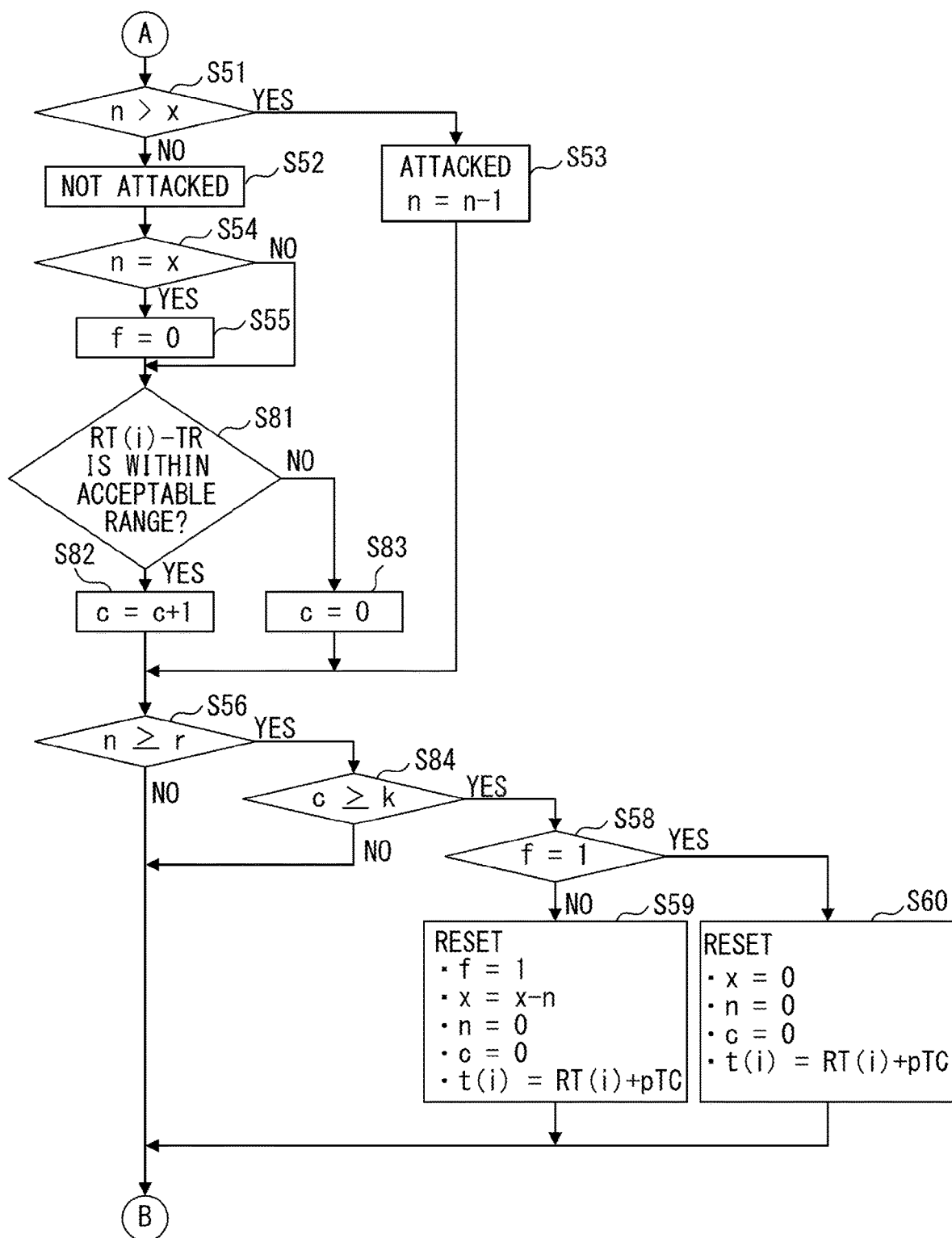
FIG. 16 is a flowchart that illustrates an example of an attack detection method according to a sixth embodiment.

FIG. 16 is a flowchart that illustrates an example of an attack detection method according to the sixth embodiment. The processes performed before the process of S51 are substantially the same in the fourth embodiment and the sixth embodiment, so their descriptions are omitted. However, in the sixth embodiment, the variable c is given. The variable c is obtained by counting the number of segments (that is, the number of count sections) in which the difference between the reception times of two most recently received messages is within a specified range. Further, in the attack detection method according to the sixth embodiment, the processes of S81 to S84 are performed in addition to the procedure of the fourth embodiment.

In S81, the reset controller 6 decides whether the difference (RT(i)-TR) between the reception times of two messages most recently received by the receiver 2 is within an acceptable range with respect to the transmission cycle TC. When the difference is within the acceptable range, the reset controller 6 increments the variable c by 1 in S82. When the difference is very different from the transmission cycle TC, the reset controller 6 resets the variable c to zero in S83. Here, when this difference is within the acceptable range, an attack message does not arrive at the attack detection device 1. Thus, the variable c represents a period of time in which normal messages arrive sequentially.

The process of S84 is performed when the count value n is greater than or equal to the threshold r. Then, in S84, the reset controller 6 compares the variable c with the specified threshold k. When the variable c is less than the threshold r, the process performed by the attack detection device 1 returns to S45 in FIG. 13. When the variable c is not less than the threshold k, the reset controller 6 performs the resetting process of S59 or S60. In other words, when the count value n is greater than or equal to the threshold r and normal messages arrive sequentially in k or more consecutive count sections, resetting is performed. In the sixth embodiment, the variable c is reset to zero by performing the resetting process of S59 or S60.

Next, examples of an attack detection method are described. In the following description, the attack detection device 1 performs a detection process according to the second embodiment. The transmission cycle TC of a detection-target ID is 100 ms. The threshold r that represents a cycle in which resetting is performed is 5. The timing parameter p is 0.5. The acceptable range for a target reception time that is used in S21 of FIG. 9 is the target reception time ±20 percent of the transmission cycle TC. It is assumed that a message to which a detection-target ID is not attached is ignored.

First Example

In the first example, it is assumed that a message arrives at the attack detection device 1 as illustrated in FIG. 7.

(1) The receiver 2 receives the first message (a reference message) at a time 52 ms. This reception time is recorded as RT(0). The count value n is initialized to zero. The predicted value x is set to 1. Then, an end time t(1) of the first monitor range is calculated using the following formula. t(1) corresponds to an end time of a count section C1.

$$t(1)=RT(0)+(1+p)TC=52+1.5\times 100=202$$

(2) The receiver 2 receives a next message at a time 148 ms (=RT(1)). The count value n is updated from 0 to 1. Here, the reception time RT(1) is before the end time t(1) of the count section C1, so the decision processes of S7 to S9 are performed without the process of S6 being performed. Here, the count value n is 1 and the predicted value x is also 1. In other words, "n>x" is not satisfied. Thus, a result of the decision is "not attacked". The count value n is less than the threshold r, so resetting is not performed.

(3) The receiver 2 receives a next message at a time 253 ms (=RT(2)). The count value n is updated from 1 to 2. Here, the reception time RT(1) is after the end time t(1) of the count section C1, so the process of S6 is performed. As a result, the predicted value x is updated from 1 to 2. Further, an end time t(2) of a next monitor range is calculated using the following formula. t(2) corresponds to an end time of a count section C2.

$$t(2)=t(1)+TC=202+100=302$$

After that, the decision processes of S7 to S9 are performed. Here, the count value n is 2 and the predicted value x is also 2. In other words, "n>x" is not satisfied. Thus, a result of the decision is "not attacked". The count value n is less than the threshold r, so resetting is not performed.

(4) The receiver 2 receives a next message at a time 360 ms (=RT(3)). The count value n is updated from 2 to 3. Here, the reception time RT(3) is after the end time t(2) of the count section C2, so the process of S6 is performed. As a result, the predicted value x is updated from 2 to 3. Further, an end time t(3) of a next monitor range is calculated using the following formula. t(3) corresponds to an end time of a count section C3.

$$t(3)=t(2)+TC=302+100=402$$

After that, the decision processes of S7 to S9 are performed. Here, the count value n is 3 and the predicted value x is also 3. In other words, "n>x" is not satisfied. Thus, a result of the decision is "not attacked". The count value n is less than the threshold r, so resetting is not performed.

(5) The receiver 2 receives a next message at a time 450 ms (=RT(4)). The count value n is updated from 3 to 4. Here, the reception time RT(4) is after the end time t(3) of the count section C3, so the process of S6 is performed. As a result, the predicted value x is updated from 3 to 4. Further, an end time t(4) of a next monitor range is calculated using the following formula. t(4) corresponds to an end time of a count section C4.

$$t(4)=t(3)+TC=402+100=502$$

After that, the decision processes of S7 to S9 are performed. Here, the count value n is 4 and the predicted value x is also 4. In other words, "n>x" is not satisfied. Thus, a result of the decision is "not attacked". The count value n is less than the threshold r, so resetting is not performed.

(6) The receiver 2 receives a next message at a time 548 ms (=RT(5)). The count value n is updated from 4 to 5. Here, the reception time RT(5) is after the end time t(4) of the count section C4, so the process of S6 is performed. As a result, the predicted value x is updated from 4 to 5. Further, an end time t(5) of a next monitor range is calculated using the following formula. t(5) corresponds to an end time of a count section C5.

$$t(5)=t(4)+TC=502+100=602$$

After that, the decision processes of S7 to S9 are performed. Here, the count value n is 5 and the predicted value x is also 5. In other words, "n>x" is not satisfied. Thus, a result of the decision is "not attacked". However, the count value n is 5 and is the same as the threshold r, so the process of S21 is performed.

(6a) The target reception time for the count section C5 is in the middle of the count section C5 and is obtained by subtracting 50 from the end time t(5) of the count section C5. That is, the target reception time is 552 ms. In this case, the acceptable range is between 532 and 572 ms. Thus, the reception time RT(5) of the message is within the acceptable range, and the resetting process of S11 is performed. As a result, the count value n is updated from "5" to "0". The predicted value x is updated from "5" to "0 (=x-n)". Further, the end time t(5) of the next monitor range is recalculated using the following formula.

$$t(5)=RT(5)+p\times TC=548+50=598$$

(7) The receiver 2 receives a next message at a time 652 ms (=RT(6)). The count value n is updated from 0 to 1. Here, the reception time RT(6) is after the end time t(5) of the count section C5, so the process of S6 is performed. As a result, the predicted value x is updated from 0 to 1. Further, an end time t(6) of a next monitor range is calculated using the following formula. t(6) corresponds to an end time of a count section C6.

$$t(6)=t(5)+TC=598+100=698$$

After that, the decision processes of S7 to S9 are performed. Here, the count value n is 1 and the predicted value x is also 1. In other words, "n>x" is not satisfied. Thus, a result of the decision is "not attacked". The count value n is less than the threshold r, so resetting is not performed.

(8) The receiver 2 receives a next message at a time 678 ms (=RT(6x)). The count value n is updated from 1 to 2. Here, the reception time RT(6x) is before the end time t(6) of the count section C6, so the decision processes of S7 to S9 are performed without the process of S6 being performed. Here, the count value n is 2 and the predicted value x is 1. In other words, "n>x" is satisfied. Thus, a result of the decision is "attacked". In this case, the count value n is decremented by 1. In other words, the count value n is updated from 2 to 1. The updated count value n is less than the threshold r, so resetting is not performed.

(9) The receiver 2 receives a next message at a time 750 ms (=RT(7)). The count value n is updated from 1 to 2. Here, the reception time RT(7) is after the end time t(6) of the count section C6, so the process of S6 is performed. As a result, the predicted value x is updated from 1 to 2. Further, an end time t(7) of a next monitor range is calculated using the following formula. t(7) corresponds to an end time of a count section C7.

$$t(7)=t(6)+TC=698+100=798$$

After that, the decision processes of S7 to S9 are performed. Here, the count value n is 2 and the predicted value x is also 2. In other words, "n>x" is not satisfied. Thus, a result of the decision is "not attacked". The count value n is less than the threshold r, so resetting is not performed.

(10) The receiver 2 receives a next message at a time 852 ms (=RT(8)). The count value n is updated from 2 to 3. Here, the reception time RT(8) is after the end time t(7) of the count section C7, so the process of S6 is performed. As a result, the predicted value x is updated from 2 to 3. Further, an end time t(8) of a next monitor range is calculated using the following formula. t(8) corresponds to an end time of a count section C8.

$$t(8)=t(7)+TC=798+100=898$$

After that, the decision processes of S7 to S9 are performed. Here, the count value n is 3 and the predicted value x is also 3. In other words, "n>x" is not satisfied. Thus, a result of the decision is "not attacked". The count value n is less than the threshold r, so resetting is not performed.

(11) The receiver 2 receives a next message at a time 940 ms (=RT(9)). The count value n is updated from 3 to 4. Here, the reception time RT(9) is after the end time t(8) of the count section C8, so the process of S6 is performed. As a result, the predicted value x is updated from 3 to 4. Further, an end time t(9) of a next monitor range is calculated using the following formula. t(9) corresponds to an end time of a count section C9.

$$t(9)=t(8)+TC=898+100=998$$

After that, the decision processes of S7 to S9 are performed. Here, the count value n is 4 and the predicted value x is also 4. In other words, "n>x" is not satisfied. Thus, a result of the decision is "not attacked". The count value n is less than the threshold r, so resetting is not performed.

(12) The receiver 2 receives a next message at a time 1050 ms (=RT(10)). The count value n is updated from 4 to 5. Here, the reception time RT(10) is after the end time t(9) of the count section C9, so the process of S6 is performed. As a result, the predicted value x is updated from 4 to 5. Further, an end time t(10) of a next monitor range is calculated using the following formula. t(10) corresponds to an end time of a count section C10.

$$t(10)=t(9)+TC=998+100=1098$$

After that, the decision processes of S7 to S9 are performed. Here, the count value n is 5 and the predicted value x is also 5. In other words, "n>x" is not satisfied. Thus, a result of the decision is "not attacked". However, the count value n is 5 and is the same as the threshold r, so the process of S21 is performed.

(12a) The target reception time for the count section C10 is in the middle of the count section C10 and is obtained by subtracting 50 from the end time t(10) of the count section C10. That is, the target reception time is 1048 ms. In this case, the acceptable range is between 1028 and 1068 ms. The reception time RT(10) of the message is within the acceptable range, and the resetting process of S11 is performed. As a result, the count value n is updated from "5" to "0". The predicted value x is updated from "5" to "0 (=x-n)". Further, the end time t(10) of the next monitor range is recalculated using the following formula.

$$t(10)=RT(10)+p \times TC=1050+50=1100$$

Likewise, the processes of the flowchart illustrated in FIG. 9 are performed every time a message arrives at the attack detection device 1, and an attack in the network 100 is detected.

Second Example

Figure 17:
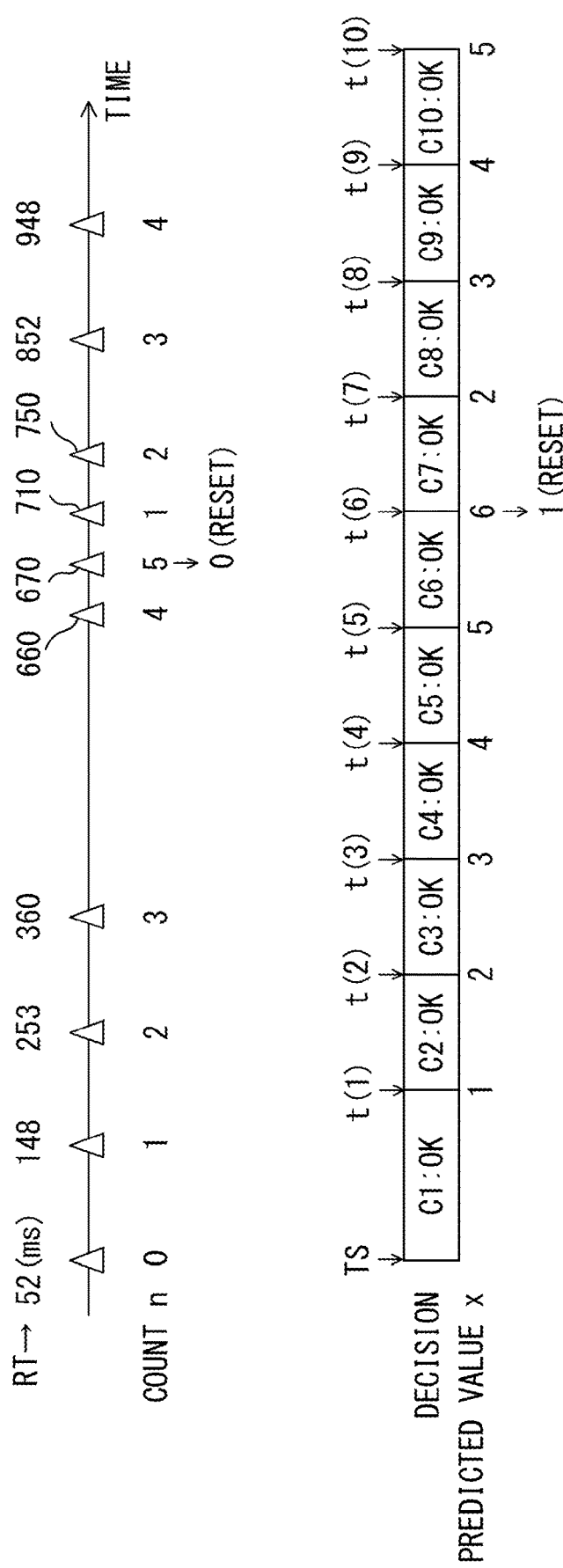
FIG. 17 illustrates a second example of the attack detection method.

In a second example, a message arrives at the attack detection device 1 as illustrated in FIG. 17. The second example corresponds to the case in which a delay in transmitting a message occurs.

(1) As in the case of the first example illustrated in FIG. 7, the receiver 2 receives a reference message at a time 52 ms. Subsequently, the receiver 2 receives messages at a time 148 ms, at a time 253 ms, and at a time 360 ms, respectively. As a result, the count value n is 3 and the predicted value x is also 3. An end time t(3) of a count section C3 is 402 ms. After that, a delay in transmitting a message occurs, and the attack detection device 1 does not receive a message for about 300 ms.

(2) The receiver 2 receives a next message at a time 660 ms (=RT(4)). The count value n is updated from 3 to 4. Here, the reception time RT(4) is after the end time t(3) of the count section C3, so the process of S6 is performed. As a result, the predicted value x is updated from 3 to 4. Further, an end time t(4) of a next monitor range is calculated using the following formula. t(4) corresponds to an end time of a count section C4.

$$t(4)=t(3)+TC=402+100=502$$

(2a) The reception time RT(4) is after the end time t(4) of the count section C4. Thus, the process of S6 is performed again. As a result, the predicted value x is updated from 4 to 5. Further, an end time t(5) of a next monitor range is calculated using the following formula. t(5) corresponds to an end time of a count section C5.

$$t(5)=t(4)+TC=502+100=602$$

(2b) The reception time RT(4) is still after the end time t(5) of the count section C5. Thus, the process of S6 is further performed again. As a result, the predicted value x is updated from 5 to 6. Further, an end time t(6) of a next monitor range is calculated using the following formula. t(6) corresponds to an end time of a count section C6.

$$t(6)=t(5)+TC=602+100=702$$

(2c) The reception time RT(4) is before the end time t(6) of the count section C6, so the decision processes of S7 to S9 are performed. Here, the count value n is 4 and the predicted value x is 6. In other words, "n>x" is not satisfied. Thus, a result of the decision is "not attacked". The count value n is less than the threshold r, so resetting is not performed.

(3) The receiver 2 receives a next message at a time 670 ms (=RT(5)). The count value n is updated from 4 to 5. Here, the reception time RT(5) is before the end time t(6) of the count section C6, so the decision processes of S7 to S9 are performed without the process of S6 being performed. Here, the count value n is 5 and the predicted value x is 6. In other words, "n>x" is not satisfied. Thus, a result of the decision is "not attacked". However, the count value n is 6 and is greater than the threshold r, so the process of S21 is performed.

(3a) The target reception time for the count section C6 is in the middle of the count section C6 and is obtained by subtracting 50 from the end time t(6) of the count section C6. That is, the target reception time is 652 ms. In this case, the acceptable range is between 632 and 672 ms. Thus, the reception time RT(5) of the message is within the acceptable range, and the resetting process of S11 is performed. As a result, the count value n is updated from "5" to "0". The predicted value x is updated from "6" to "1 (=x-n)". Further, the end time t(6) of the next monitor range is recalculated using the following formula.

$$t(6)=RT(5)+p \times TC=670+50=720$$

(4) The receiver 2 receives a next message at a time 710 ms (=RT(6)). The count value n is updated from 0 to 1. Here, the reception time RT(6) is before the end time t(6) of the count section C6, so the decision processes of S7 to S9 are performed without the process of S6 being performed. Here, the count value n is 1 and the predicted value x is also 1. In other words, "n>x" is not satisfied. Thus, a result of the decision is "not attacked". The count value n is less than the threshold r, so resetting is not performed.

(5) The receiver 2 receives a next message at a time 750 ms (=RT(7)). The count value n is updated from 1 to 2. Here, the reception time RT(7) is after the end time t(6) of the count section C6, so the process of S6 is performed. As a result, the predicted value x is updated from 1 to 2. Further, an end time t(7) of a next monitor range is calculated using the following formula. t(7) corresponds to an end time of a count section C7.

$$t(7)=t(6)+TC=720+100=820$$

After that, the decision processes of S7 to S9 are performed. Here, the count value n is 2 and the predicted value x is also 2. In other words, "n>x" is not satisfied. Thus, a result of the decision is "not attacked". The count value n is less than the threshold r, so resetting is not performed.

(6) The receiver 2 receives a next message at a time 852 ms (=RT(8)). The count value n is updated from 2 to 3. Here, the reception time RT(8) is after the end time t(7) of the count section C7, so the process of S6 is performed. As a result, the predicted value x is updated from 2 to 3. Further, an end time t(8) of a next monitor range is calculated using the following formula. t(8) corresponds to an end time of a count section C8.

$$t(8)=t(7)+TC=820+100=920$$

After that, the decision processes of S7 to S9 are performed. Here, the count value n is 3 and the predicted value x is also 3. In other words, "n>x" is not satisfied. Thus, a result of the decision is "not attacked". The count value n is less than the threshold r, so resetting is not performed.

(7) The receiver 2 receives a next message at a time 948 ms (=RT(9)). The count value n is updated from 3 to 4. Here, the reception time RT(9) is after the end time t(8) of the count section C8, so the process of S6 is performed. As a result, the predicted value x is updated from 3 to 4. Further, an end time t(9) of a next monitor range is calculated using the following formula. t(9) corresponds to an end time of a count section C9.

$$t(9)=t(8)+TC=920+100=1020$$

After that, the decision processes of S7 to S9 are performed. Here, the count value n is 4 and the predicted value x is also 4. In other words, "n>x" is not satisfied. Thus, a result of the decision is "not attacked". The count value n is less than the threshold r, so resetting is not performed.

Likewise, the processes of the flowchart illustrated in FIG. 9 are performed every time a message arrives at the attack detection device 1, and an attack in the network 100 is detected. As described above, even if the timing of receiving a message is behind schedule due to, for example, a delay in transmitting the message, the attack detection device 1 will not regard a normal message as an attack message. In other words, an erroneous detection is prevented.

Third Example

Figure 18:
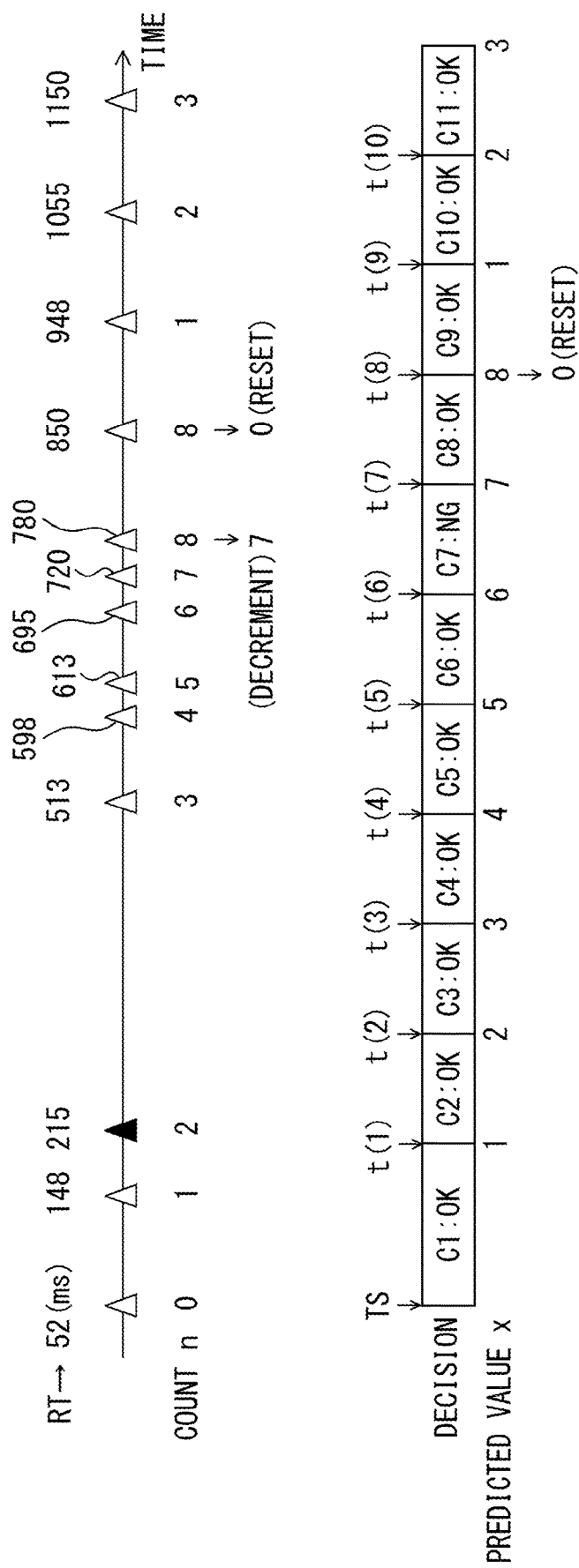
FIG. 18 illustrates a third example of the attack detection method.

In a third example, a message arrives at the attack detection device 1 as illustrated in FIG. 18. In the third example, an attack message is input to the network 100 and a delay in transmitting a message occurs.

(1) As in the first example illustrated in FIG. 7, the receiver 2 receives a reference message at a time 52 ms. Subsequently, the receiver 2 receives a message at a time 148 ms. As a result, the count value n is 1 and the predicted value x is also 1. The end time t(1) of a count section C1 is 202 ms.

(2) The receiver 2 receives a next message at a time 215 ms (=RT(1x)). The count value n is updated from 1 to 2. Here, the reception time RT(1x) is after the end time t(1) of the count section C1, so the process of S6 is performed. As a result, the predicted value x is updated from 1 to 2. Further, an end time t(2) of a next monitor range is calculated using the following formula. t(2) corresponds to an end time of a count section C2.

$$t(2)=t(1)+TC=202+100=302$$

After that, the decision processes of S7 to S9 are performed. Here, the count value n is 2 and the predicted value x is also 2. In other words, "n>x" is not satisfied. Thus, a result of the decision is "not attacked". The count value n is less than the threshold r, so resetting is not performed.

In this example, the message arriving at the attack detection device 1 at the time 215 ms is not a normal message but an attack message. However, at this point, the count value n is not greater than the predicted value x, so the detector 5 does not detect a state in which the network 100 has been attacked. After that, a delay in transmitting a message occurs and the attack detection device 1 does not receive a message for about 300 ms.

(3) The receiver 2 receives a next message at a time 513 ms (=RT(2)). The count value n is updated from 2 to 3. Here, the reception time RT(2) is after the end time t(2) of the count section C2, so the process of S6 is performed. As a result, the predicted value x is updated from 2 to 3. Further, an end time t(3) of a next monitor range is calculated using the following formula. t(3) corresponds to an end time of a count section C3.

$$t(3)=t(2)+TC=302+100=402$$

(3a) The reception time RT(2) is after the end time t(3) of the count section C3. Thus, the process of S6 is performed again. As a result, the predicted value x is updated from 3 to 4. Further, an end time t(4) of a next monitor range is calculated using the following formula. t(4) corresponds to an end time of a count section C4.

$$t(4)=t(3)+TC=402+100=502$$

(3b) The reception time RT(2) is still after the end time t(4) of the count section C4. Thus, the process of S6 is further performed again. As a result, the predicted value x is updated from 4 to 5. Further, an end time t(5) of a next monitor range is calculated using the following formula. t(5) corresponds to an end time of a count section C5.

$$t(5)=t(4)+TC=502+100=602$$

(3c) The reception time RT(2) is before the end time t(5) of the count section C5, so the decision processes of S7 to S9 are performed. Here, the count value n is 3 and the predicted value x is 5. In other words, "n>x" is not satisfied. Thus, a result of the decision is "not attacked". The count value n is less than the threshold r, so resetting is not performed.

(4) The receiver 2 receives a next message at a time 598 ms (=RT(3)). The count value n is updated from 3 to 4. Here, the reception time RT(3) is before the end time t(5) of the count section C5, so the decision processes of S7 to S9 are performed without the process of S6 being performed. Here, the count value n is 4 and the predicted value x is 5. In other words, "n>x" is not satisfied. Thus, a result of the decision is "not attacked". The count value n is less than the threshold r, so resetting is not performed.

(5) The receiver 2 receives a next message at a time 613 ms (=RT(4)). The count value n is updated from 4 to 5. Here, the reception time RT(4) is after the end time t(5) of the count section C5, so the process of S6 is performed. As a result, the predicted value x is updated from 5 to 6. Further, an end time t(6) of a next monitor range is calculated using the following formula. t(6) corresponds to an end time of a count section C6.

$$t(6)=t(5)+TC=602+100=702$$

(5a) The reception time RT(4) is before the end time t(6) of the count section C6, so the decision processes of S7 to S9 are performed. Here, the count value n is 5 and the predicted value x is 6. In other words, "n>x" is not satisfied. Thus, a result of the decision is "not attacked". However, the count value n is 5 and is the same as the threshold r, so the process of S21 is performed.

(5b) The target reception time for the count section C6 is in the middle of the count section C6 and is obtained by subtracting 50 from the end time t(6) of the count section C6. That is, the target reception time is 652 ms. In this case, the acceptable range is between 632 and 672 ms. Thus, the reception time RT(4) of the message is outside of the acceptable range, and resetting is not performed.

(6) The receiver 2 receives a next message at a time 695 ms (=RT(5)). The count value n is updated from 5 to 6. Here, the reception time RT(5) is before the end time t(6) of the count section C6, so the decision processes of S7 to S9 are performed without the process of S6 being performed. Here, the count value n is 6 and the predicted value x is also 6. In other words, "n>x" is not satisfied. Thus, a result of the decision is "not attacked". However, the count value n is 6 and is greater than the threshold r, so the process of S21 is performed.

(6a) As described above, the target reception time for the count section C6 is 652 ms. Further, the acceptable range is between 632 and 672 ms. Thus, the reception time RT(5) of the message is outside of the acceptable range, and resetting is not performed.

(7) The receiver 2 receives a next message at a time 720 ms (=RT(6)). The count value n is updated from 6 to 7. Here, the reception time RT(7) is after the end time t(6) of the count section C6, so the process of S6 is performed. As a result, the predicted value x is updated from 6 to 7. Further, an end time t(7) of a next monitor range is calculated using the following formula. t(7) corresponds to an end time of a count section C7.

$$t(7)=t(6)+TC=702+100=802$$

(7a) The reception time RT(6) is before the end time t(6) of the count section C6, so the decision processes of S7 to S9 are performed. Here, the count value n is 7 and the predicted value x is 7. In other words, "n>x" is not satisfied. Thus, a result of the decision is "not attacked". However, the count value n is 7 and is greater than the threshold r, so the process of S21 is performed.

(7b) The target reception time for the count section C7 is in the middle of the count section C7 and is obtained by subtracting 50 from the end time t(7) of the count section C7. That is, the target reception time is 752 ms. In this case, the acceptable range is between 732 and 772 ms. Thus, the reception time RT(6) of the message is outside of the acceptable range, and resetting is not performed.

(8) The receiver 2 receives a next message at a time 780 ms (=RT(7)). The count value n is updated from 7 to 8. Here, the reception time RT(7) is before the end time t(7) of the count section C7, so the decision processes of S7 to S9 are performed without the process of S6 being performed. Here, the count value n is 8 and the predicted value x is 7. In other words, "n>x" is satisfied. Thus, a result of the decision is "attacked". In this case, the count value n is decremented by 1. In other words, the count value n is updated from 8 to 7. The updated count value n is 7 and is greater than the threshold r, so the process of S21 is performed. However, as described above, the target reception time for the count section C7 is 752 ms, and the acceptable range is between 732 and 772 ms. Thus, the reception time RT(7) of the message is outside of the acceptable range, and resetting is not performed.

(9) The receiver 2 receives a next message at a time 850 ms (=RT(8)). The count value n is updated from 7 to 8. Here, the reception time RT(8) is after the end time t(7) of the count section C7, so the process of S6 is performed. As a result, the predicted value x is updated from 7 to 8. Further, an end time t(8) of a next monitor range is calculated using the following formula. t(8) corresponds to an end time of a count section C8.

$$t(8)=t(7)+TC=802+100=902$$

After that, the decision processes of S7 to S9 are performed. Here, the count value n is 8 and the predicted value x is also 8. In other words, "n>x" is not satisfied. Thus, a result of the decision is "not attacked". However, the count value n is 8 and is greater than the threshold r, so the process of S21 is performed.

(9a) The target reception time for the count section C8 is in the middle of the count section C8 and is obtained by subtracting 50 from the end time t(8) of the count section C8. That is, the target reception time is 852 ms. In this case, the acceptable range is between 832 and 872 ms. Thus, the reception time RT(8) of the message is within the acceptable range, and the resetting process of S11 is performed. As a result, the count value n is updated from "8" to "0". The predicted value x is updated from "8" to "0 (=x-n)". Further, the end time t(8) of the next monitor range is recalculated using the following formula.

$$t(8)=RT(8)+p \times TC=850+50=900$$

(10) The receiver 2 receives a next message at a time 948 ms (=RT(9)). The count value n is updated from 0 to 1. Here, the reception time RT(9) is after the end time t(8) of the count section C8, so the process of S6 is performed. As a result, the predicted value x is updated from 0 to 1. Further, an end time t(9) of a next monitor range is calculated using the following formula. t(9) corresponds to an end time of a count section C9.

$$t(9)=t(8)+TC=900+100=1000$$

After that, the decision processes of S7 to S9 are performed. Here, the count value n is 1 and the predicted value x is also 1. In other words, "n>x" is not satisfied. Thus, a result of the decision is "not attacked". The count value n is less than the threshold r, so resetting is not performed.

Likewise, the processes of the flowchart illustrated in FIG. 9 are performed every time a message arrives at the attack detection device 1, and an attack in the network 100 is detected. As described above, even if the timing of receiving a message is behind schedule due to, for example, a delay in transmitting the message, the attack detection device 1 can detect an attack in the network 100 accurately.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An attack detection device comprising:
a receiver configured to receive messages that are periodically transmitted from a communication device in a network; and
a processor configured to
predict a number of messages to be received by the receiver in a specified monitor range based on a transmission cycle of the messages so as to generate a predicted value,
count a number of messages received by the receiver in the specified monitor range so as to generate a count value,
reset the count value and the predicted value when the count value is greater than or equal to a specified threshold; and
detect an attack in the network according to a result of a comparison between the predicted value and the count value, wherein
the processor updates the count value to zero and updates the predicted value to a value obtained by subtracting the count value from the predicted value in a process of resetting the count value and the predicted value.

2. The attack detection device according to claim 1, wherein
the processor decides that the network has been attacked when the count value is greater than the predicted value.

3. The attack detection device according to claim 1, wherein
the processor resets the count value and the predicted value when the count value is greater than or equal to the threshold and a time at which a message is received by the receiver is within an acceptable range that is determined for a target reception time.

4. The attack detection device according to claim 1, wherein
the processor resets the count value and the predicted value when the count value is greater than or equal to the threshold and a difference between the reception times of two consecutive messages received by the receiver is within an acceptable range that is determined with respect to the transmission cycle.

5. The attack detection device according to claim 1, wherein
when a difference between the predicted value and the count value is not zero over a period of time in which the receiver receives a specified number of messages, the processor updates both the count value and the predicted value to zero in the process of resetting the count value and the predicted value.

6. The attack detection device according to claim 1, wherein
when a difference between the predicted value and the count value is a constant value other than zero over a period of time in which the receiver receives a specified number of messages, the processor updates both the count value and the predicted value to zero in the process of resetting the count value and the predicted value.

7. The attack detection device according to claim 1, wherein
when a difference between reception times of two consecutive messages received by the receiver is within an acceptable range that is determined with respect to the transmission cycle over a period of time in which the receiver receives a specified number of messages, the processor updates both the count value and the predicted value to zero in the process of resetting the count value and the predicted value.

8. An attack detection method comprising:
receiving, using a receiver, messages that are periodically transmitted from a communication device in a network;
predicting a number of messages to be received by the receiver in a specified monitor range based on a transmission cycle of the messages so as to generate a predicted value;
counting a number of messages received by the receiver in the specified monitor range so as to generate a count value;
resetting the count value and the predicted value when the count value is greater than or equal to a specified threshold; and
detecting an attack in the network according to a result of a comparison between the predicted value and the count value, wherein
the count value is updated to zero and the predicted value is updated to a value obtained by subtracting the count value from the predicted value in a process of resetting the count value and the predicted value.

9. A non-transitory computer-readable recording medium having stored therein a program for causing a processor to execute an attack detection process, the processor being implemented in an attack detection device, the attack detection device including a receiver, the attack detection device being connected to a network in which messages are periodically transmitted from a communication device, the attack detection process comprising:
predicting a number of messages to be received by the receiver in a specified monitor range based on a transmission cycle of the messages so as to generate a predicted value;
counting a number of messages received by the receiver in the specified monitor range so as to generate a count value;
resetting the count value and the predicted value when the count value is greater than or equal to a specified threshold; and
detecting an attack in the network according to a result of a comparison between the predicted value and the count value, wherein
the count value is updated to zero and the predicted value is updated to a value obtained by subtracting the count value from the predicted value in a process of resetting the count value and the predicted value.

* * * * *